(12) United States Patent  
Ando et al.

(10) Patent No.: US 11,208,000 B2  
(45) Date of Patent: Dec. 28, 2021

(54) VEHICLE

(71) Applicant: TOYOTA JIDOSHA KABUSHIKI KAISHA, Toyota (JP)

(72) Inventors: Yuya Ando, Toyota (JP); Takeaki Suzuki, Toyota (JP); Shinsuke Iwasaki, Toyota (JP); Miki Sugita, Toyota (JP); Yuko Asano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 227 days.

(21) Appl. No.: 16/694,169

(22) Filed: Nov. 25, 2019

(65) Prior Publication Data

US 2020/0180462 A1   Jun. 11, 2020

(30) Foreign Application Priority Data

Dec. 7, 2018   (JP) .............................. JP2018-230326

(51) Int. Cl.
| | |
|---|---|
| *H02J 7/00* | (2006.01) |
| *H02J 7/14* | (2006.01) |
| *B60L 53/60* | (2019.01) |
| *B60L 58/12* | (2019.01) |
| *B60L 53/20* | (2019.01) |

(52) U.S. Cl.
CPC ............... *B60L 53/60* (2019.02); *B60L 53/20* (2019.02); *B60L 58/12* (2019.02)

(58) Field of Classification Search
USPC ........................................................ 320/109
See application file for complete search history.

(56) References Cited

FOREIGN PATENT DOCUMENTS

| JP | 2017-104000 A | 6/2017 |
| JP | 2018-052176 A | 4/2018 |

*Primary Examiner* — Alexis B Pacheco  
(74) *Attorney, Agent, or Firm* — Sughrue Mion, PLLC

(57) ABSTRACT

There is provided a vehicle comprising a power storage device; a connecting portion configured to be connectable with an external power source; a converter configured to be connected with the connecting portion and with the power storage device; and a control device configured to control the converter. When the external power source is connected with the connecting portion, the control device performs charging control to control the converter, such that electric power from the external power source is subjected to voltage conversion and is then supplied to the power storage device. On completion of charging of the power storage device, the control device starts a system by using electric power from the power storage device after disconnection of the converter from the external power source.

6 Claims, 17 Drawing Sheets

VEHICLE

CROSS-REFERENCE TO RELATED APPLICATIONS

The present disclosure claims priority to Japanese Patent Application No. 2018-230326 filed Dec. 7, 2018, which is incorporated herein by reference in its entirety including specification, drawings and claims.

TECHNICAL FIELD

The present disclosure relates to a vehicle.

BACKGROUND

A proposed configuration of a vehicle includes an auxiliary machine battery; an input-output terminal configured to be connectable with a booster cable that is connected with a rescue vehicle (external power source); a relay placed in an electrical conduction path that is arranged to connect the auxiliary machine battery with the input-output terminal; an auxiliary machine battery controller configured to control the relay; and a diode placed in an electrical conduction path that is arranged to connect the input-output terminal with the auxiliary machine battery controller, such that a direction from the input-output terminal toward the auxiliary machine battery controller is a forward direction (as described in, for example, JP 2018-52176A). In the vehicle of this configuration, when an external power source is connected with the input-output terminal, electric power from the external power source is supplied to the auxiliary machine battery controller via the diode, so as to start the auxiliary machine battery controller. In response to the user's subsequent starting operation, the vehicle is started by using the electric power from the external power source.

The vehicle of the above configuration is started by using the electric power from the external power source. Accordingly, the vehicle is likely to be affected in the course of starting the vehicle by a voltage and the like from the external power source, and noise generated in the course of starting the vehicle is likely to be transmitted to the external power source.

SUMMARY

A main object of a vehicle of the present disclosure is to suppress the vehicle from being affected by a voltage and the like from an external power source in the course of starting the vehicle and to suppress noise generated in the course of starting the vehicle from being transmitted to the external power source.

In order to achieve the above primary object, the vehicle of the present disclosure employs the following configuration.

The present disclosure is directed to a vehicle. The vehicle includes a power storage device, a connecting portion configured to be connectable with an external power source, a converter configured to be connected with the connecting portion and with the power storage device, and a control device configured to control the converter, wherein when the external power source is connected with the connecting portion, the control device controls the converter, such that electric power from the external power source is subjected to voltage conversion and is then supplied to the power storage device, and on completion of charging of the power storage device, the control device starts a system by using electric power from the power storage device after disconnection of the converter from the external power source.

When an external power source is connected with the connecting portion, the vehicle of this aspect controls the converter, such that electric power from the external power source is subjected to voltage conversion and is then supplied to the power storage device. Even when the voltages of the power storage device and the external power source differ from each other by some degree, such control enables the power storage device to be charged, while suppressing generation of an overvoltage or an overcurrent in the power storage device. On completion of charging of the power storage device, the vehicle of this aspect starts the system by using electric power from the power storage device after disconnection of the converter from the external power source. This configuration enables the system to be started without being affected by a voltage and the like from the external power source and suppresses noise generated in the course of a system start from being transmitted to the external power source.

DETAILED DESCRIPTION OF EMBODIMENTS

The following describes some aspects of the disclosure with reference to embodiments.

First Embodiment

Figure 1:
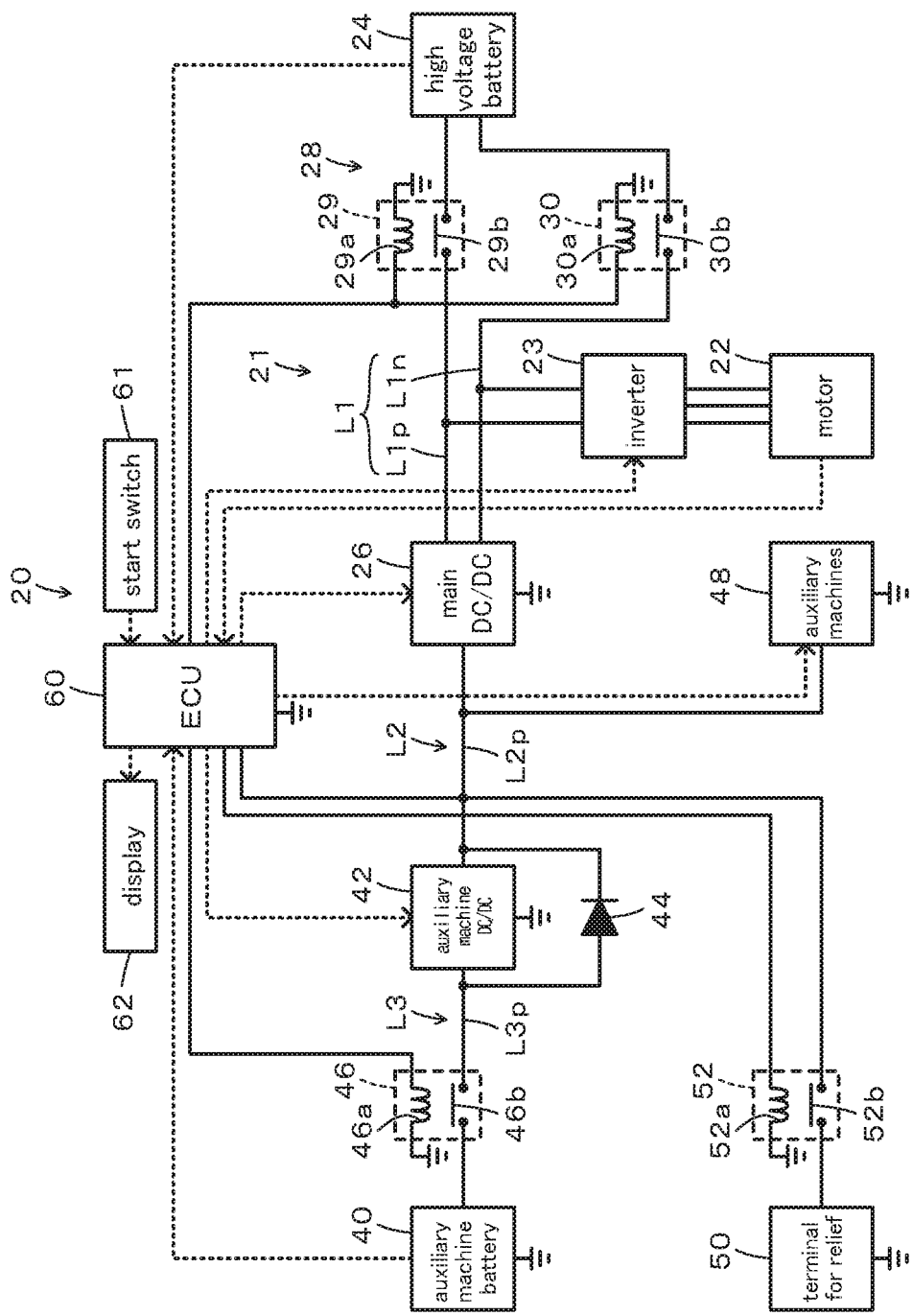
FIG. 1 is a configuration diagram illustrating the schematic configuration of a motor vehicle according to a first embodiment of the present disclosure.

FIG. 1 is a configuration diagram illustrating the schematic configuration of a motor vehicle 20 according to a first embodiment of the present disclosure.

The motor vehicle 20 of the first embodiment is configured as an electric vehicle or a hybrid vehicle and, as illustrated, includes a driving system 21, an auxiliary machine battery 40 serving as a power storage device, an auxiliary machine DC-DC converter 42, a diode 44, a relay 46, auxiliary machines 48, a terminal for relief 50, a relay 52, and an electronic control unit (hereinafter referred to as "ECU") 60.

The driving system 21 includes a motor 22, an inverter 23, a high voltage battery 24, a main DC-DC converter 26 and a system main relay 28. The motor 22 is configured, for example, as a synchronous generator motor having a rotor and a stator and has its rotor connected with a driveshaft (not shown) that is linked with drive wheels (not shown). The inverter 23 is used to drive the motor 22 and is connected with a positive electrode line Lip and a negative electrode line L1n of power lines L1. The ECU 60 performs switching control of a plurality of switching elements included in the inverter 23, so as to rotate and drive the motor 22. The high voltage battery 24 is configured as, for example, a lithium ion rechargeable battery or a nickel metal hydride secondary battery having a rated voltage of about several hundred V.

The main DC-DC converter 26 has a positive electrode terminal and a negative electrode terminal on one side that are respectively connected with the positive electrode line Lip and the negative electrode line L1n of the power lines L1 and has a positive electrode terminal on the other side that is connected with a positive electrode line L2p of power lines L2 and a negative electrode terminal on the other side that is grounded to a metal vehicle body. According to the first embodiment, the vehicle body is used as a negative electrode line L2n of the power lines L2 and as a negative electrode line L3n of power lines L3 described later. Accordingly, "grounding to the vehicle body" is synonymous with connecting with the "negative electrode line L2n of the power lines L2" or connecting with the "negative electrode line L3n of the power lines L3" described later. This main DC-DC converter 26 serves to step down the voltage of electric power of the power lines L1 and supply the electric power of the stepped-down voltage to the power lines L2.

The system main relay 28 includes a positive electrode relay 29 and a negative electrode relay 30. The positive electrode relay 29 is turned on and off to connect and disconnect a positive electrode terminal of the high voltage battery 24 with and from the positive electrode line Lip of the power lines L1. This positive electrode relay 29 is configured as a normally open-type electromagnetic relay and includes a coil 29a and an actuating portion 29b. The coil 29a has one end that is connected with the ECU 60 and the other end that is grounded to the vehicle body. The actuating portion 29b is set in a connecting state to connect the positive electrode terminal of the high voltage battery 24 with the positive electrode line L1p of the power lines L1 in the state that the coil 29a establishes electrical continuity, while being set in a shutoff state to disconnect the positive electrode terminal of the high voltage battery 24 from the positive electrode line L1p of the power lines L1 in the state that the coil 29a breaks electrical continuity.

The negative electrode relay 30 is turned on and off to connect and disconnect a negative electrode terminal of the high voltage battery 24 with and from the negative electrode line L1n of the power lines L1. This negative electrode relay 30 is configured as a normally open-type electromagnetic relay and includes a coil 30a and an actuating portion 30b. The coil 30a has one end that is connected with the ECU 60 and the other end that is grounded to the vehicle body. The actuating portion 30b is set in a connecting state to connect the negative electrode terminal of the high voltage battery 24 with the negative electrode line L1n of the power lines L1 in the state that the coil 30a establishes electrical continuity, while being set in a shutoff state to disconnect the negative electrode terminal of the high voltage battery 24 from the negative electrode line L1n of the power lines L1 in the state that the coil 30a breaks electrical continuity.

The auxiliary machine battery 40 is configured as, for example, a lithium ion rechargeable battery, a nickel metal hydride secondary battery or a lead acid battery having a rated voltage of about 12 V to 16 V and has a positive electrode terminal that is connected with a positive electrode line L3p of the power lines L3 and a negative electrode terminal that is grounded to the vehicle body.

The auxiliary machine DC-DC converter 42 has a positive electrode terminal on one side that is connected with the positive electrode line L2p of the power lines L2, a positive electrode terminal on the other side that is connected with the positive electrode line L3p of the power lines L3, and a negative electrode terminal that is grounded to the vehicle body. This auxiliary machine DC-DC converter 42 serves to cause electric power to be transmitted between the power lines L2 and the power lines L3, accompanied with voltage conversion.

The diode 44 is connected with the positive electrode line L3p of the power lines L3 and with the positive electrode line L2p of the power lines L2, such that a direction from the positive electrode line L3p of the power lines L3 toward the positive electrode line L2p of the power lines L2 is a forward direction, and is also connected in parallel to the auxiliary machine DC-DC converter 42.

The relay 46 is turned on and off to connect and disconnect the positive electrode terminal of the auxiliary machine battery 40 with and from the positive electrode line L3p of the power lines L3. This relay 46 is configured as a ratchet electromagnetic relay, which requires electric current for changing over between on and off but does not require electric current for keeping on or for keeping off, and includes a coil 46a and an actuating portion 46b. The coil 46a has one end that is connected with the ECU 60 and the other end that is grounded to the vehicle body. When the coil 46a is changed over from the state of breaking electrical continuity to the state of establishing electrical continuity in a shutoff state of the actuating portion 46b to disconnect the positive electrode terminal of the auxiliary machine battery 40 from the positive electrode line L3p of the power lines L3, the actuating portion 46b is set in a connecting state to connect the positive electrode terminal of the auxiliary machine battery 40 with the positive electrode line L3p of the power lines L3. The actuating portion 46b keeps the connecting state, even when the coil 46a is changed over from the state of establishing electrical continuity to the state of breaking electrical continuity. When the coil 46a is changed over from the state of breaking electrical continuity to the state of establishing electrical continuity in the connecting state of the actuating portion 46b, on the other hand, the actuating portion 46b is set in the shutoff state. The actuating portion 46b keeps the shutoff state, even when the coil 46a is changed over from the state of establishing electrical continuity to the state of breaking electrical continuity.

Each of the auxiliary machines 48 has a positive electrode terminal that is connected with the positive electrode line L2p of the power lines L2 and a negative electrode terminal that is grounded to the vehicle body. These auxiliary machines 48 are configured to be operated at voltages equivalent to the voltage of the auxiliary machine battery 40. The auxiliary machines 48 include, for example, an audio system, automatic windows, and a navigation system.

The terminal for relief 50 has a positive electrode terminal and a negative electrode terminal. The negative electrode terminal is grounded to the vehicle body. A positive electrode terminal and a negative electrode terminal of an external power source for rescue (for example, an auxiliary machine battery of a rescue vehicle) are connectable with this terminal for relief 50 via a cable (booster cable).

The relay 52 is turned on and off to connect and disconnect the terminal for relief 50 with and from the positive electrode line L2p of the power lines L2. This relay 52 is configured as a ratchet electromagnetic relay and includes a coil 52a and an actuating portion 52b. The coil 52a has one end that is connected with the ECU 60 and the other end that is grounded to the vehicle body. When the coil 52a is changed over from the state of breaking electrical continuity to the state of establishing electrical continuity in a shutoff state of the actuating portion 52b to disconnect the positive electrode terminal of the terminal for relief 50 from the positive electrode line L2p of the power lines L2, the actuating portion 52b is set in a connecting state to connect the positive electrode terminal of the terminal for relief 50 with the positive electrode line L2p of the power lines L2. The actuating portion 52b keeps the connecting state, even when the coil 52a is changed over from the state of establishing electrical continuity to the state of breaking electrical continuity. When the coil 52a is changed over from the state of breaking electrical continuity to the state of establishing electrical continuity in the connecting state of the actuating portion 52b, on the other hand, the actuating portion 52b is set in the shutoff state. The actuating portion 52b keeps the shutoff state, even when the coil 52a is changed over from the state of establishing electrical continuity to the state of breaking electrical continuity.

The ECU 60 is configured as as a CPU-based microprocessor and includes a ROM configured to store processing programs, a RAM configured to temporarily store data, input/output ports, and a communication port, in addition to the CPU, although not being illustrated. This ECU 60 has a positive electrode terminal that is connected with the positive electrode line L2p of the power lines L2 and a negative electrode terminal that is grounded to the vehicle body, and is operated by receiving a supply of electric power from the power lines L2.

Signals from various sensors are input into the ECU 60 via the input port. The signals input into the ECU 60 include, for example, a rotation position θm from a rotation position sensor configured to detect a rotating position of the rotor of the motor 22, phase currents Iu and Iv from current sensors configured to detect electric currents flowing in respective phases of the motor 22, a voltage Vh from a voltage sensor configured to detect the voltage of the high voltage battery 24, and an electric current Ih from a current sensor configured to detect the electric current of the high voltage battery 24. The input signals also include a voltage VL1 from a voltage sensor configured to detect the voltage of the power lines L1, a voltage VL2 from a voltage sensor configured to detect the voltage of the power lines L2 and a voltage VL3 from a voltage sensor configured to detect the voltage of the power lines L3. The input signals further include a voltage Va from a voltage sensor configured to detect the voltage of the auxiliary machine battery 40 and an electric current Ia from a current sensor configured to detect the electric current of the auxiliary machine battery 40. Additionally, the input signals include an on-off signal from a start switch 61.

Various control signals are output from the ECU 60 via the output port. The signals output from the ECU 60 include, for example, control signals to the inverter 23, the main DC-DC converter 26, the auxiliary machine DC-DC converter 42, the auxiliary machines 48, a display 62 and the like. The ECU 60 sets the coil 29a and the coil 30a in the state of establishing electrical continuity or in the state of breaking electrical continuity to control on and off of the positive electrode relay 29 and the negative electrode relay 30. The ECU 60 also changes over the coil 46a from the state of breaking electrical continuity to the state of establishing electrical continuity, so as to control the changeover between on and off of the relay 46. The ECU 60 further changes over the coil 52a from the state of breaking electrical continuity to the state of establishing electrical continuity, so as to control the changeover between on and off of the relay 52.

The ECU 60 calculates a state of charge SOCh of the high voltage battery 24, based on the electric current Ih of the high voltage battery 24 input from the current sensor, and also calculates a state of charge SOCa of the auxiliary machine battery 40, based on the electric current Ia of the auxiliary machine battery 40 input from the current sensor.

Figure 2:
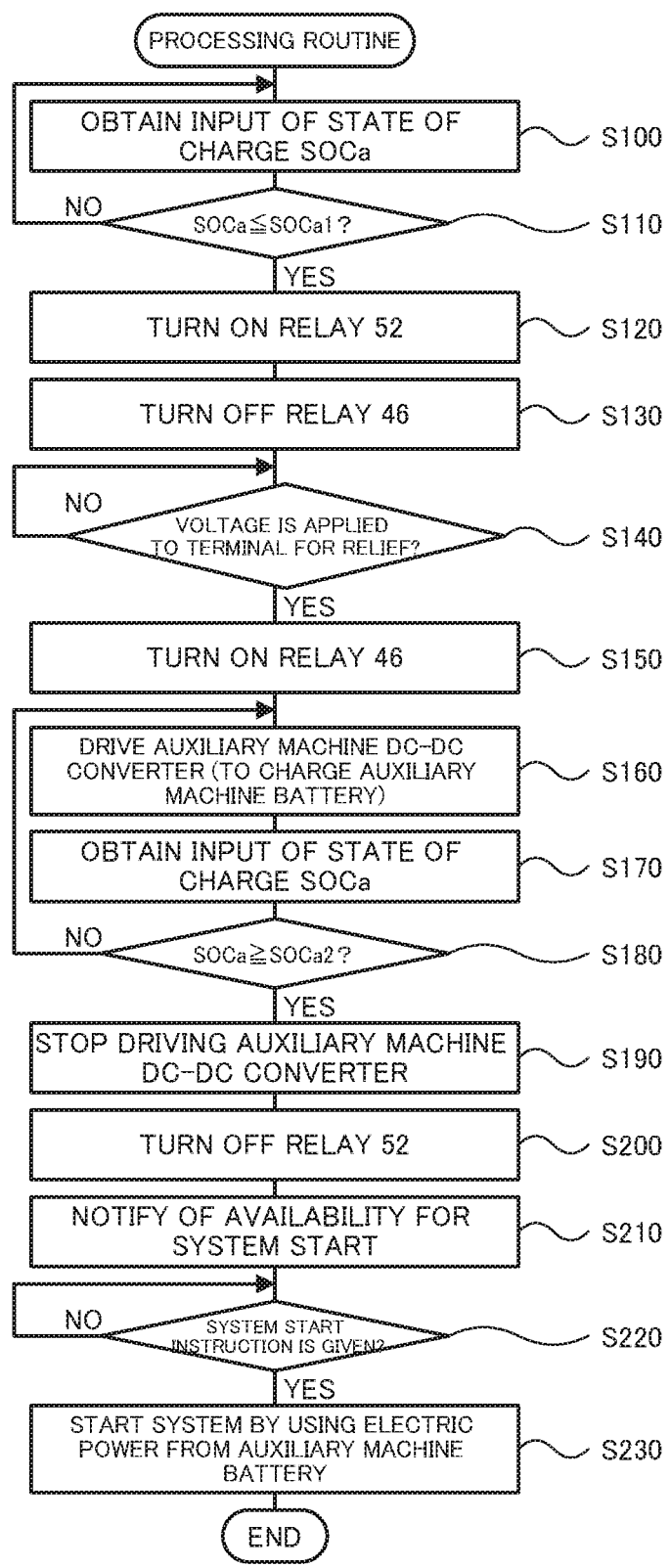
FIG. 2 is a flowchart showing one example of a processing routine according to the first embodiment.

The following describes operations of the motor vehicle 20 of the first embodiment having the configuration described above or more specifically a series of operations to start the system of the motor vehicle 20 after the motor vehicle 20 is left for a long time period. FIG. 2 is a flowchart showing one example of a processing routine. This processing routine is triggered when the motor vehicle 20 is parked and the system is stopped. The processing routine is performed by the ECU 60 except the processing of step S140.

When the processing routine of FIG. 2 is triggered, the ECU 60 first obtains the input of the state of charge SOCa of the auxiliary machine battery 40 (step S100) and compares the input state of charge SOCa of the auxiliary machine battery 40 with a reference value SOCa1 (step S110). The reference value SOCa1 herein denotes a threshold value used to determine whether the motor vehicle 20 is left for a long time period and thereby whether the state of charge SOCa of the auxiliary machine battery 40 becomes a sufficiently low level by the dark current that is supplied from the auxiliary machine battery 40 to the ECU 60, to the auxiliary machines 48 and the like and may be, for example, 15%, 20% or 25%. When the state of charge SOCa of the auxiliary machine battery 40 is higher than the reference value SOCa1, the ECU 60 returns the processing routine to step S100.

When it is determined at step S110 that the state of charge SOCa of the auxiliary machine battery 40 becomes equal to or lower than the reference value SOCa1, the ECU 60 turns on the relay 52 (step S120) and subsequently turns off the relay 46 (step S130). Both the relays 46 and 52 are configured as ratchet electromagnetic relays. The ECU 60 accordingly changes over the coils 52a and 46a from the state of breaking electrical continuity to the state of establishing electrical continuity, so as to turn on the relay 52 and turn off the relay 46.

Turning off the relay 46 causes no electric power to be supplied from the auxiliary machine battery 40 to the power lines L3, the auxiliary machine DC-DC converter 42, the power lines L2 or the like and thereby stops the ECU 60. Both the relays 46 and 52 are configured as ratchet electromagnetic relays. Even when the ECU 60 is stopped and the respective coils 46a and 52a of the relays 46 and 52 are set in the state of breaking electrical continuity, this keeps the relay 52 on and keeps the relay 46 off. Since the relay 52 is kept on, the terminal for relief 50 is kept connected with the power lines L2.

When an external power source for rescue (for example, an auxiliary machine battery of a rescue vehicle) is subsequently connected with the terminal for relief 50 via a cable to apply a voltage to the terminal for relief 50 (step S140), electric power is supplied from the terminal for relief 50 through the power lines L2 to the ECU 60, so as to start the ECU 60. The ECU 60 then turns on the relay 46 (step S150). The ECU 60 changes over the coil 46a from the state of breaking electrical continuity to the state of establishing electrical continuity, so as to turn on the relay 46.

The ECU 60 subsequently controls the auxiliary machine DC-DC converter 42, such that the electric power of the power lines L2 (i.e., the electric power from the external power source) is subjected to voltage conversion and is then supplied to the power lines L3 (the auxiliary machine battery 40) (step S160). Even when the voltages of the auxiliary machine battery 40 and the external power source differ from each other by some degree (for example, by about several V), such control suppresses generation of an overvoltage or an overcurrent in the auxiliary machine battery 40. In this state, the driving system 21 and the auxiliary machines 48 keep their inactive states.

The ECU 60 subsequently obtains the input of the state of charge SOCa of the auxiliary machine battery 40 (step S170) and compares the input state of charge SOCa of the auxiliary machine battery 40 with a reference value SOCa2 that is larger than the reference value SOCa1 described above (step S180). The reference value SOCa2 herein denotes a threshold value used to determine whether an amount of electric power (an amount of charge) required for a system start is ensured and may be, for example, a value larger than the reference value SOCa1 by 5%, 10% or 15%. When the state of charge SOCa of the auxiliary machine battery 40 is lower than the reference value SOCa2, the ECU 60 returns the processing routine to step S160.

When the state of charge SOCa of the auxiliary machine battery 40 becomes equal to or higher than the reference value SOCa2 at step S180 by repetition of the processing of steps S160 to S180, the ECU 60 stops driving the auxiliary machine DC-DC converter 42 (step S190) and turns off the relay 52 (step S200). The ECU 60 changes over the coil 52a from the state of breaking electrical continuity to the state of establishing electrical continuity, so as to turn off the relay 52. Turning off the relay 52 disconnects the power lines L2 from the terminal for relief 50 that is connected with the external power source. Even when the relay 52 is turned off, the ECU 60 receives the supply of electric power from the auxiliary machine battery 40 through the power lines L3, the diode 44 and the power lines L2 and is accordingly kept in the operating state.

The ECU 60 subsequently notifies the user of the availability for system start (step S210). For example, a concrete procedure of the notification may display a message such as "A system start is available" on the display 62 or may provide audio output of such a message from a speaker (not shown). This causes the user to recognize the availability for system start (i.e., permission for a system start instruction).

The ECU 60 waits for the user's system start instruction (step S220), starts the system by using the electric power from the auxiliary machine battery 40 (step S230) and then terminates this processing routine. The system start instruction may be provided by, for example, the user's ON operation of the start switch 61. In the system start process, for example, the ECU 60 turns on the system main relay 28 (the positive electrode relay 29 and the negative electrode relay 30). The ECU 60 sets the coils 29a and 30a in the state of establishing electrical continuity, so as to turn on the system main relay 28. The ECU 60 receives the supply of electric power from the auxiliary machine battery 40 through the power lines L3, the diode 44 and the power lines L2. Accordingly, in other words, the system main relay 28 is turned on by using the electric power from the auxiliary machine battery 40. Starting the system by using the electric power from the auxiliary machine battery 40 after turning off the relay 52, i.e., after disconnecting the power lines L2 from the terminal for relief 50 that is connected with the external power source, enables the system to be started without being affected by the voltage and the like from the external power source and suppresses noise generated in the course of a system start from being transmitted to the external power source.

On completion of the system start, the ECU 60 controls the main DC-DC converter 26, such that the electric power of the power lines L1 is subjected to voltage conversion and is then supplied to the power lines L2, and controls the auxiliary machine DC-DC converter 42, such that the electric power of the power lines L2 is subjected to voltage conversion and is then supplied to the power lines L3. This causes the electric power of the high voltage battery 24 to be supplied to the auxiliary machine battery 40 through the power lines L1, the main DC-DC converter 26, the power lines L2, the auxiliary machine DC-DC converter 42 and the power lines L3, so as to charge the auxiliary machine battery 40.

Figure 3:
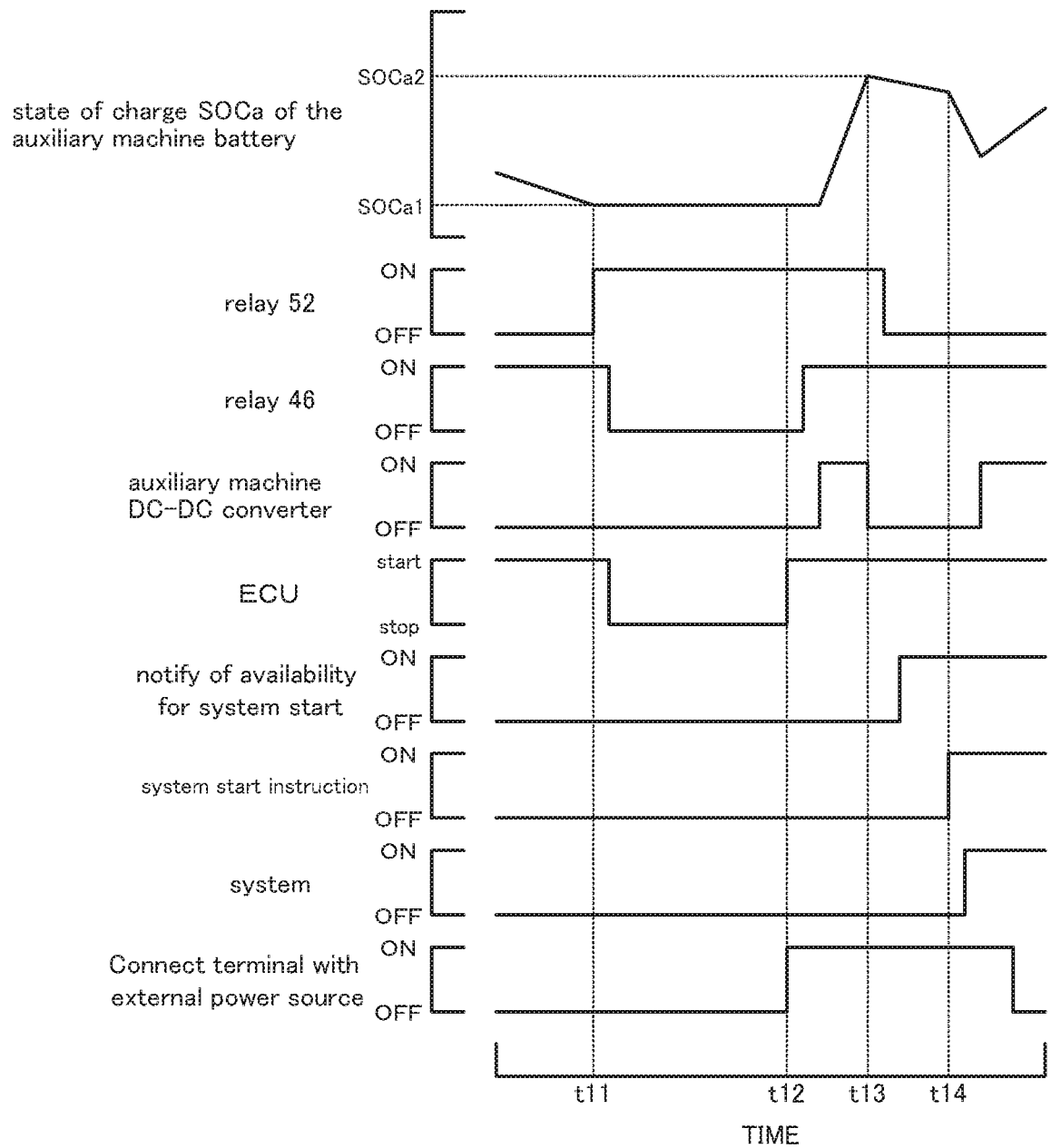
FIG. 3 is a diagram illustrating one example of a process of a system start of the motor vehicle after the motor vehicle of the first embodiment is left for a long time period.

FIG. 3 is a diagram illustrating one example of a process of a system start of the motor vehicle 20 after the motor vehicle 20 is left for a long time period. As illustrated, when the state of charge SOCa of the auxiliary machine battery 40 becomes equal to or lower than the reference value SOCa1 (at a time t11), the ECU 60 turns on the relay 52 and subsequently turns off the relay 46. Turning off the relay 46 stops the ECU 60. Subsequent connection of an external power source for rescue with the terminal for relief 50 to apply a voltage to the terminal for relief 50 (at a time t12) starts the ECU 60. The ECU 60 turns on the relay 46 and controls the auxiliary machine DC-DC converter 42, such that the electric power of the power lines L2 is subjected to voltage conversion and is then supplied to the power lines L3. This enables the auxiliary machine battery 40 to be charged with the electric power from the external power source.

When the state of charge SOCa of the auxiliary machine battery 40 becomes equal to or higher than the reference value SOCa2 (at a time t13), the ECU 60 stops driving the auxiliary machine DC-DC converter 42, turns off the relay 52 and notifies the user of the availability for system start. In response to the user's subsequent system start instruction (at a time t14), the ECU 60 starts the system by using the electric power from the auxiliary machine battery 40. On completion of the system start, the ECU 60 controls the main DC-DC converter 26, such that the electric power of the power lines L1 is subjected to voltage conversion and is then supplied to the power lines L2, and controls the auxiliary machine DC-DC converter 42, such that the electric power of the power lines L2 is subjected to voltage conversion and is then supplied to the power lines L3. This enables the auxiliary machine battery 40 to be charged with the electric power from the high voltage battery 24. After the relay 52 is turned off, the external power source is detached from the terminal for relief 50 by the user.

In the motor vehicle 20 of the first embodiment described above, when an external power source for rescue is connected with the terminal for relief 50 to apply a voltage to the terminal for relief 50 during a stop of the ECU 60 at the on position of the relay 52 and at the off position of the relay 46, this starts the ECU 60. The ECU 60 turns on the relay 46 and controls the auxiliary machine DC-DC converter 42, such that the electric power of the power lines L2 (the electric power from the external power source) is subjected to voltage conversion and is then supplied to the power lines L3 (i.e., the auxiliary machine battery 40). Even when the voltages of the auxiliary machine battery 40 and the external power source differ from each other by some degree, such control enables the auxiliary machine battery 40 to be charged, while suppressing generation of an overvoltage or an overcurrent in the auxiliary machine battery 40. On completion of charging of the auxiliary machine battery 40, the motor vehicle 20 of the first embodiment turns off the relay 52 and subsequently starts the system by using the electric power from the auxiliary machine battery 40 in response to the user's system start instruction. This enables the system to be started without being affected by the voltage and the like from the external power source and suppresses noise generated in the course of a system start from being transmitted to the external power source.

The motor vehicle 20 of the first embodiment is configured to notify the user of the availability for system start after completion of charging of the auxiliary machine battery 40 and a subsequent off operation of the relay 52 and to start the system by using the electric power from the auxiliary machine battery 40 in response to the user's system start instruction. A modification may automatically start the system in response to completion of charging of the auxiliary machine battery 40 and a subsequent off operation of the relay 52.

The motor vehicle 20 of the first embodiment described above has the configuration shown in FIG. 1. The present disclosure is also applicable to a motor vehicle 120 according to a modification having a configuration shown in FIG. 4 or to a motor vehicle 220 according to another modification having a configuration shown in FIG. 5. The following sequentially describes these motor vehicles 120 and 220.

Figure 4:
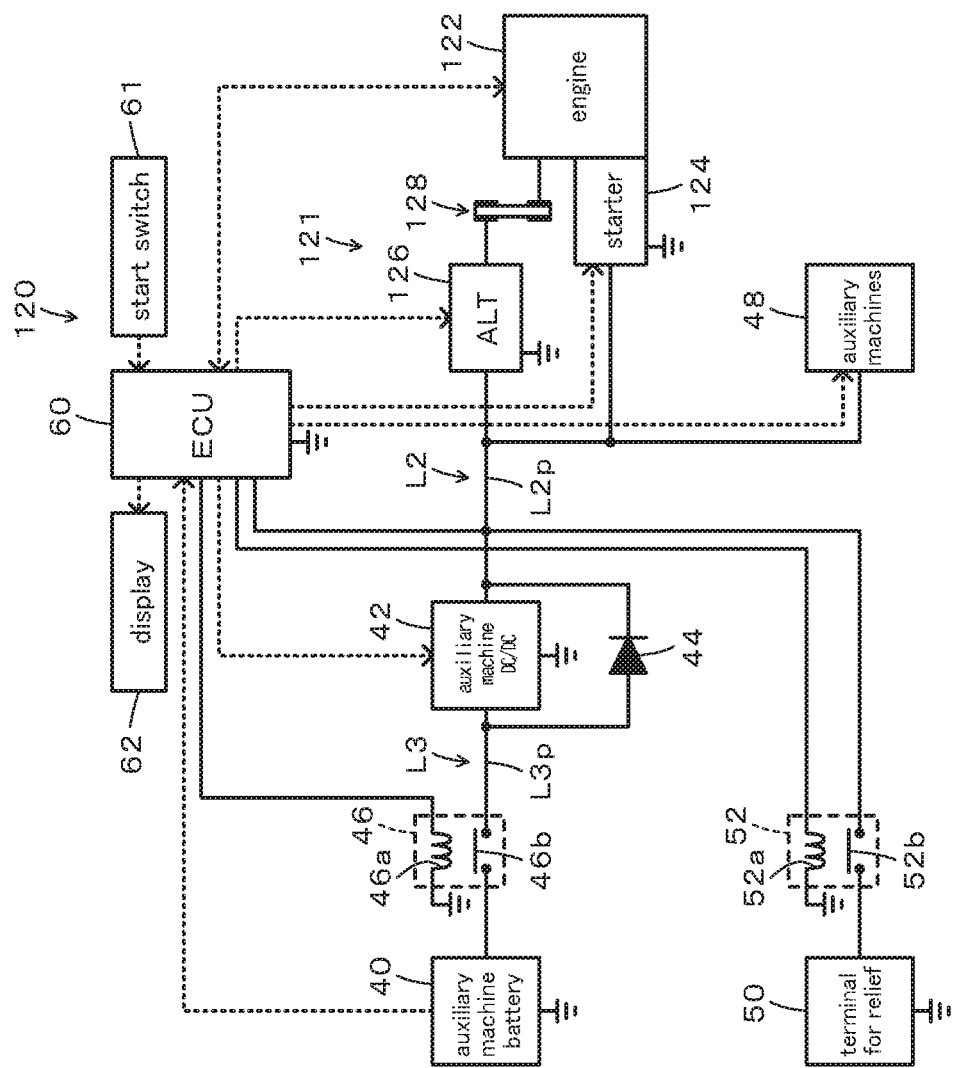
FIG. 4 is a configuration diagram illustrating the schematic configuration of a motor vehicle according to a modification of the first embodiment.

The motor vehicle 120 shown in FIG. 4 is described below. The motor vehicle 120 of FIG. 4 has a similar hardware configuration to that of the motor vehicle 20 shown in FIG. 1, except replacement of the driving system 21 with a driving system 121. Accordingly, like hardware components of the motor vehicle 120 to those of the motor vehicle 20 are expressed by like reference signs with omission of their detailed description.

The driving system 121 includes an engine 122, a starter 124 and an alternator 126. The starter 124 is connected with a crankshaft of the engine 122, for example, via a one-way clutch and has a positive electrode terminal that is connected with the positive electrode line L2p of the power lines L2 and a negative electrode terminal that is grounded to the vehicle body. The alternator 126 is connected with the crankshaft of the engine 122 via a belt mechanism 128 and has a positive electrode terminal that is connected with the positive electrode line L2p of the power lines L2 and a negative electrode terminal that is grounded to the vehicle body.

In this motor vehicle 120, for example, a crank angle $\theta cr$ from a crank angle sensor configured to detect the crank angle of the engine 122 is input into the ECU 60 via the input port, in addition to various signals similar to the input signals described above with regard to the motor vehicle 20. Control signals to the engine 122, the starter 124 and the alternator 126 are output from the ECU 60 via the output port, in addition to various control signals similar to the control signals described above with regard to the motor vehicle 20.

In this motor vehicle 120, the ECU 60 similarly performs the processing routine of FIG. 2. According to a concrete procedure of the system start at step S230 in the processing routine of FIG. 2, the ECU 60 controls the engine 122 and the starter 124, such that the engine 122 is cranked and started by the starter 124. This causes electric power to be supplied from the auxiliary machine battery 40 to the starter 124 through the power lines L3, the diode 44 and the power lines L2. Such control causes the motor vehicle 120 to have similar advantageous effects to those of the motor vehicle 20 described above.

Figure 5:
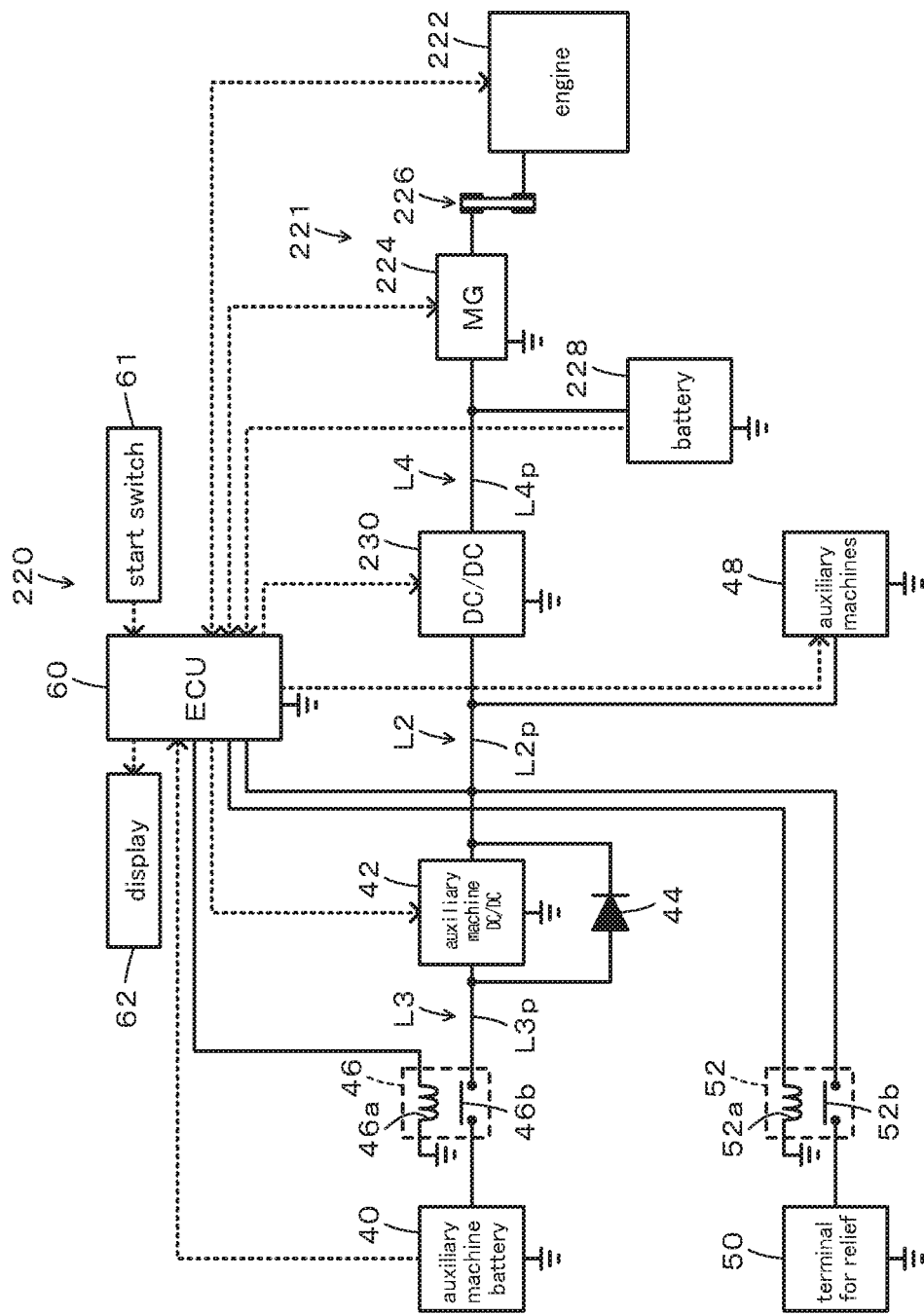
FIG. 5 is a configuration diagram illustrating the schematic configuration of a motor vehicle according to another modification of the first embodiment.

The motor vehicle 220 shown in FIG. 5 is described below. The motor vehicle 220 of FIG. 5 has a similar hardware configuration to that of the motor vehicle 20 shown in FIG. 1, except replacement of the driving system 21 with a driving system 221. Accordingly, like hardware components of the motor vehicle 220 to those of the motor vehicle 20 are expressed by like reference signs with omission of their detailed description.

The driving system 221 includes an engine 222, a motor generator 224, a battery 228 and a DC-DC converter 230. The motor generator 224 is connected with a crankshaft of the engine 222 via a belt mechanism 226 and has a positive electrode terminal that is connected with a positive electrode line L4p of power lines L4 and a negative electrode terminal that is grounded to the vehicle body. "Grounding to the vehicle body" is synonymous with connecting with the "negative electrode line L2n of the power lines L2", connecting with the "negative electrode line L3n of the power lines L3" or connecting with a "negative electrode line L4n of the power lines L4".

The battery 228 is configured as, for example, a lithium ion rechargeable battery or a nickel metal hydride secondary battery having a rated voltage of about 40 V to 50 V and has a positive electrode terminal that is connected with the positive electrode line L4p of the power lines L4 and a negative electrode terminal that is grounded to the vehicle body.

The DC-DC converter 230 has a positive electrode terminal on one side that is connected with the positive electrode line L4p of the power lines L4, a positive electrode terminal on the other side that is connected with the positive electrode line L2p of the power lines L2 and a negative electrode terminal that is grounded to the vehicle body. This DC-DC converter 230 serves to step down the voltage of electric power of the power lines L4 and supply the electric power of the stepped-down voltage to the power lines L2 and to step up the voltage of electric power of the power lines L2 and supply the electric power of the stepped-up voltage to the power lines L4.

In this motor vehicle 220, for example, a crank angle θcr from a crank angle sensor configured to detect the crank angle of the engine 222, a voltage VL4 from a voltage sensor configured to detect the voltage of the power lines L4, a voltage Vh2 from a voltage sensor configured to detect the voltage of the battery 228, and an electric current Ih2 from a current sensor configured to detect the electric current of the battery 228 are input into the ECU 60 via the input port, in addition to various signals similar to the input signals described above with regard to the motor vehicle 20. Control signals to the engine 222, the motor generator 224 and the DC-DC converter 230 are output from the ECU 60 via the output port, in addition to various control signals similar to the control signals described above with regard to the motor vehicle 20. The ECU 60 calculates a state of charge SOCh of the battery 228, based on the electric current Ih2 of the battery 228 input from the current sensor.

In this motor vehicle 220, the ECU 60 similarly performs the processing routine of FIG. 2. According to a concrete procedure of the system start at step S230 in the processing routine of FIG. 2, the ECU 60 controls the engine 222 and the motor generator 224, such that the engine 222 is cranked and started by the motor generator 224. This causes electric power to be supplied from the auxiliary machine battery 40 to the motor generator 224 through the power lines L3, the diode 44 and the power lines L2. Such control causes the motor vehicle 220 to have similar advantageous effects to those of the motor vehicle 20 described above.

Second Embodiment

Figure 6:
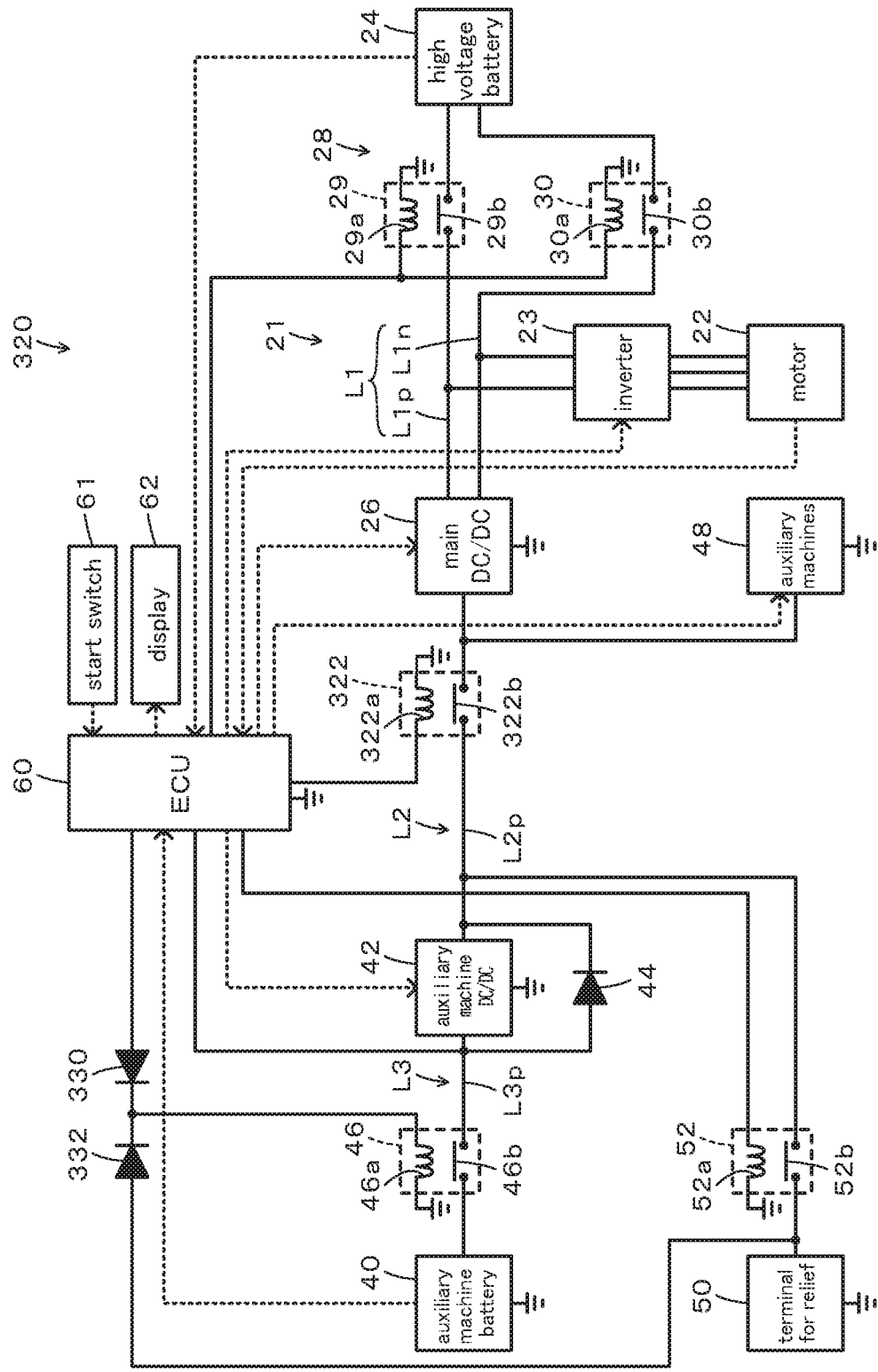
FIG. 6 is a configuration diagram illustrating the schematic configuration of a motor vehicle according to a second embodiment of the present disclosure.

FIG. 6 is a configuration diagram illustrating the schematic configuration of a motor vehicle according to a second embodiment of the present disclosure. The motor vehicle 320 shown in FIG. 6 has a similar hardware configuration to that of the motor vehicle 20 of the first embodiment shown in FIG. 1, except addition of a relay 322 and diodes 330 and 332, a different connection destination of the coil 46a of the relay and a different connection destination of the ECU 60. Accordingly, like hardware components of the motor vehicle 320 to those of the motor vehicle 20 are expressed by like reference signs with omission of their detailed description.

The relay 322 is provided between the main DC-DC converter 26- and the auxiliary machines 48-side and the auxiliary machine DC-DC converter 42-, the diode 44-, and the relay 52 (i.e., the terminal for relief 50-) side in the positive electrode line L2p of the power lines L2. The relay 322 is turned on and off to connect and disconnect the main DC-DC converter 26- and the auxiliary machines 48-side with and from the auxiliary machine DC-DC converter 42-, the diode 44- and the relay 52-side. This relay 322 is configured as a ratchet electromagnetic relay and includes a coil 322a and an actuating portion 322b. The coil 322a has one end that is connected with the ECU 60 and the other end that is grounded to the vehicle body. When the coil 322a is changed over from the state of breaking electrical continuity to the state of establishing electrical continuity in a shutoff state of the actuating portion 322b to disconnect the main DC-DC converter 26- and the auxiliary machines 48-side from the auxiliary machine DC-DC converter 42-, the diode 44- and the relay 52-side, the actuating portion 322b is set in a connecting state to connect the main DC-DC converter 26- and the auxiliary machines 48-side with the auxiliary machine DC-DC converter 42-, the diode 44- and the relay 52-side. The actuating portion 322b keeps the connecting state, even when the coil 322a is changed over from the state of establishing electrical continuity to the state of breaking electrical continuity. When the coil 322a is changed over from the state of breaking electrical continuity to the state of establishing electrical continuity in the connecting state of the actuating portion 322b, on the other hand, the actuating portion 322b is set in the shutoff state. The actuating portion 322b keeps the shutoff state, even when the coil 322a is changed over from the state of establishing electrical continuity to the state of breaking electrical continuity.

The coil 46a of the relay 46 has one end that is connected with the ECU 60 via the diode 330 and that is also connected with the terminal for relief 50 via the diode 332, and the other end that is grounded to the vehicle body. The diode 330 is arranged such that a direction from the ECU 60 toward the coil 46a is a forward direction. The diode 332 is arranged such that a direction from the terminal for relief 50 toward the coil 46a is a forward direction. Accordingly, the higher voltage between the voltage of the ECU 60 and the voltage of the terminal for relief 50 is applied to the coil 46a.

The ECU 60 has the positive electrode terminal that is connected with the positive electrode line of the power lines L3 and the negative electrode terminal that is grounded to the vehicle body. The ECU 60 changes over the coil 322a from the state of breaking electrical continuity to the state of establishing electrical continuity, so as to control the changeover between on and off of the relay 322.

Figure 7:
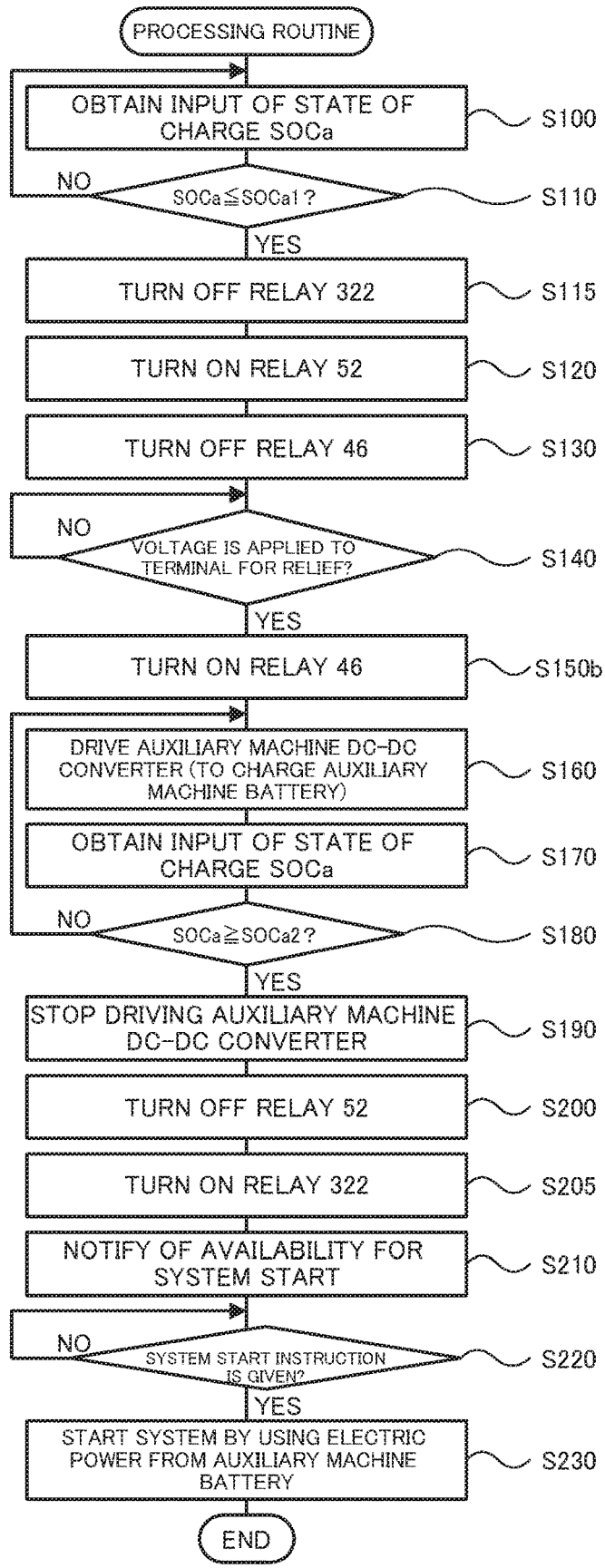
FIG. 7 is a flowchart showing one example of a processing routine according to the second embodiment.

The following describes operations of the motor vehicle 320 of the second embodiment having the configuration described above or more specifically a series of operations to start the system of the motor vehicle 320 after the motor vehicle 320 is left for a long time period. FIG. 7 is a flowchart showing one example of a processing routine. This processing routine is triggered when the motor vehicle 320 is parked and the system is stopped. The processing routine is performed by the ECU 60 except the processing of steps S140 and S150b. This processing routine of FIG. 7 is similar to the processing routine of FIG. 2, except addition of the processing of steps S115 and S205 and replacement of the processing of step S150 that is performed by the ECU 60 with the processing of step S150b that is not performed by the ECU 60. Accordingly, like processing steps in the processing routine of FIG. 7 to those in the processing routine of FIG. 2 are expressed by like step numbers with omission of their detailed description.

In the processing routine of FIG. 7, when the state of charge SOCa of the auxiliary machine battery 40 becomes equal to or lower than the reference value SOCa1 (step S110), the ECU 60 turns off the relay 322 (step S115), turns on the relay 52 (step S120) and subsequently turns off the relay 46 (step S130). The relay 322 is configured as a ratchet electromagnetic relay. The ECU 60 accordingly changes over the coil 322a from the state of breaking electrical continuity to the state of establishing electrical continuity, so as to turn off the relay 322. As described above, turning off the relay 46 stops the ECU 60. Even when the ECU 60 is stopped and the coil 322a of the relay 322 is set in the state of breaking electrical continuity, this keeps the relay 322 off.

When an external power source for rescue is connected with the terminal for relief 50 to apply a voltage to the terminal for relief 50 (step S140), electric power is supplied from the terminal for relief 50 to the coil 46a of the relay 46 through the diode 332 to change over the coil 46a from the state of breaking electrical continuity to the state of establishing electrical continuity, so as to turn on the relay 46 (step S150b). Turning on the relay 46 causes electric power to be supplied from the auxiliary machine battery 40 to the ECU 60 through the power lines L3 and thereby starts the ECU 60.

The ECU 60 subsequently controls the auxiliary machine DC-DC converter 42, such that the electric power of the power lines L2 (i.e., the electric power from the external power source) is subjected to voltage conversion and is then supplied to the power lines L3 (i.e., the auxiliary machine battery 40), until the state of charge SOCa of the auxiliary machine battery 40 becomes equal to or higher than the reference value SOCa2 (steps S160 to S180). Even when the voltages of the auxiliary machine battery 40 and the external power source differ from each other by some degree, such control suppresses generation of an overvoltage or an overcurrent in the auxiliary machine battery 40. In this state, the relay 322 is off. Even when an external power source of a relatively high voltage (for example, a voltage level equivalent to the rated voltage of the battery 228) is connected with the terminal for relief 50, this configuration prevents the relatively high voltage from being applied to the auxiliary machines 48 and more sufficiently protects the auxiliary machines 48. In this state, the driving system 21 and the auxiliary machines 48 keep their inactive states.

When the state of charge SOCa of the auxiliary machine battery 40 becomes equal to or higher than the reference value SOCa2 (step S180), the ECU 60 stops driving the auxiliary machine DC-DC converter 42 (step S190), turns off the relay 52 (step S200) and turns on the relay 322 (step S205). The ECU 60 changes over the coil 322a from the state of breaking electrical continuity to the state of establishing electrical continuity, so as to turn on the relay 322.

The ECU 60 subsequently notifies the user of the availability for system start (step S210), waits for the user's system start instruction (step S220), starts the system by using the electric power from the auxiliary machine battery 40 (step S230), and then terminates this processing routine. Starting the system by using the electric power from the auxiliary machine battery 40 after turning off the relay 52, i.e., after disconnecting the power lines L2 from the terminal for relief 50 that is connected with the external power source, enables the system to be started without being affected by the voltage and the like from the external power source and suppresses noise generated in the course of a system start from being transmitted to the external power source.

Figure 8:
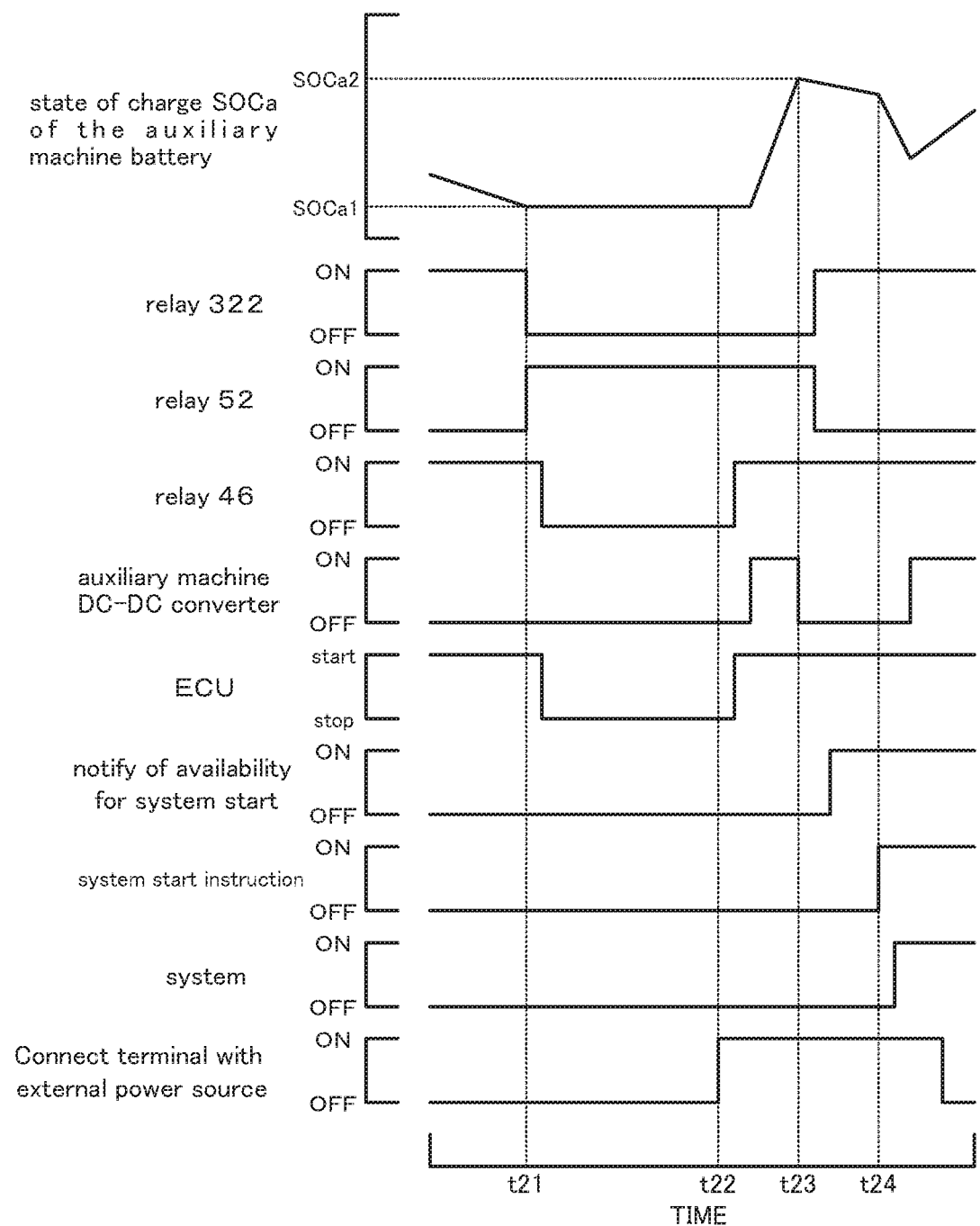
FIG. 8 is a diagram illustrating one example of a process of a system start of the motor vehicle after the motor vehicle of the second embodiment is left for a long time period.

FIG. 8 is a diagram illustrating one example of a process of a system start of the motor vehicle 320 after the motor vehicle 320 is left for a long time period. As illustrated, when the state of charge SOCa of the auxiliary machine battery 40 becomes equal to or lower than the reference value SOCa1 (at a time t21), the ECU 60 turns off the relay 322, turns on the relay 52 and subsequently turns off the relay 46. Turning off the relay 46 stops the ECU 60. An external power source for rescue is subsequently connected with the terminal for relief 50 to apply a voltage to the terminal for relief 50 (at a time t22). This turns on the relay 46 and thereby starts the ECU 60. The ECU 60 controls the auxiliary machine DC-DC converter 42, such that the electric power of the power lines L2 is subjected to voltage conversion and is then supplied to the power lines L3. This enables the auxiliary machine battery 40 to be charged with the electric power from the external power source.

When the state of charge SOCa of the auxiliary machine battery 40 becomes equal to or higher than the reference value SOCa2 (at a time t23), the ECU 60 stops driving the auxiliary machine DC-DC converter 42, turns off the relay 52, turns on the relay 322, and notifies the user of the availability for system start. In response to the user's subsequent system start instruction (at a time t24), the ECU 60 starts the system by using the electric power from the auxiliary machine battery 40. On completion of the system start, the ECU 60 controls the main DC-DC converter 26, such that the electric power of the power lines L1 is subjected to voltage conversion and is then supplied to the power lines L2, and controls the auxiliary machine DC-DC converter 42, such that the electric power of the power lines L2 is subjected to voltage conversion and is then supplied to the power lines L3. This enables the auxiliary machine battery 40 to be charged with the electric power from the high voltage battery 24. After the relay 52 is turned off, the external power source is detached from the terminal for relief 50 by the user.

In the motor vehicle 320 of the second embodiment described above, when an external power source for rescue is connected with the terminal for relief 50 to apply a voltage to the terminal for relief 50 during a stop of the ECU 60 at the off position of the relay 322, at the on position of the relay 52 and at the off position of the relay 46, this turns on the relay 46 and starts the ECU 60. The ECU 60 controls the auxiliary machine DC-DC converter 42, such that the electric power of the power lines L2 (i.e., the electric power from the external power source) is subjected to voltage conversion and is then supplied to the power lines L3 (i.e., the auxiliary machine battery 40). Even when the voltages of the auxiliary machine battery 40 and the external power source differ from each other by some degree, such control enables the auxiliary machine battery 40 to be charged, while suppressing generation of an overvoltage or an overcurrent in the auxiliary machine battery 40. In this state, the relay 322 is off. Even when an external power source of a relatively high voltage is connected with the terminal for relief 50, this configuration prevents the relatively high voltage from being applied to the auxiliary machines 48 and more sufficiently protects the auxiliary machines 48. On completion of charging of the auxiliary machine battery 40, the motor vehicle 320 of the second embodiment turns off the relay 52, turns on the relay 322 and subsequently starts the system by using the electric power from the auxiliary machine battery 40 in response to the user's system start instruction. This enables the system to be started without being affected by the voltage and the like from the external power source and suppresses noise generated in the course of a system start from being transmitted to the external power source.

The motor vehicle 320 of the second embodiment is configured to notify the user of the availability for system start after completion of charging of the auxiliary machine battery 40 and a subsequent off operation of the relay 52 and a subsequent on operation of the relay 322 and to start the system by using the electric power from the auxiliary machine battery 40 in response to the user's system start instruction. A modification may automatically start the system in response to completion of charging of the auxiliary machine battery 40 and a subsequent off operation of the relay 52 and a subsequent on operation of the relay 322.

The motor vehicle 320 of the second embodiment described above has the configuration shown in FIG. 6. The present disclosure is also applicable to a motor vehicle 420 according to a modification having a configuration shown in FIG. 9 or to a motor vehicle 520 according to another modification having a configuration shown in FIG. 10. The following sequentially describes these motor vehicles 420 and 520.

Figure 9:
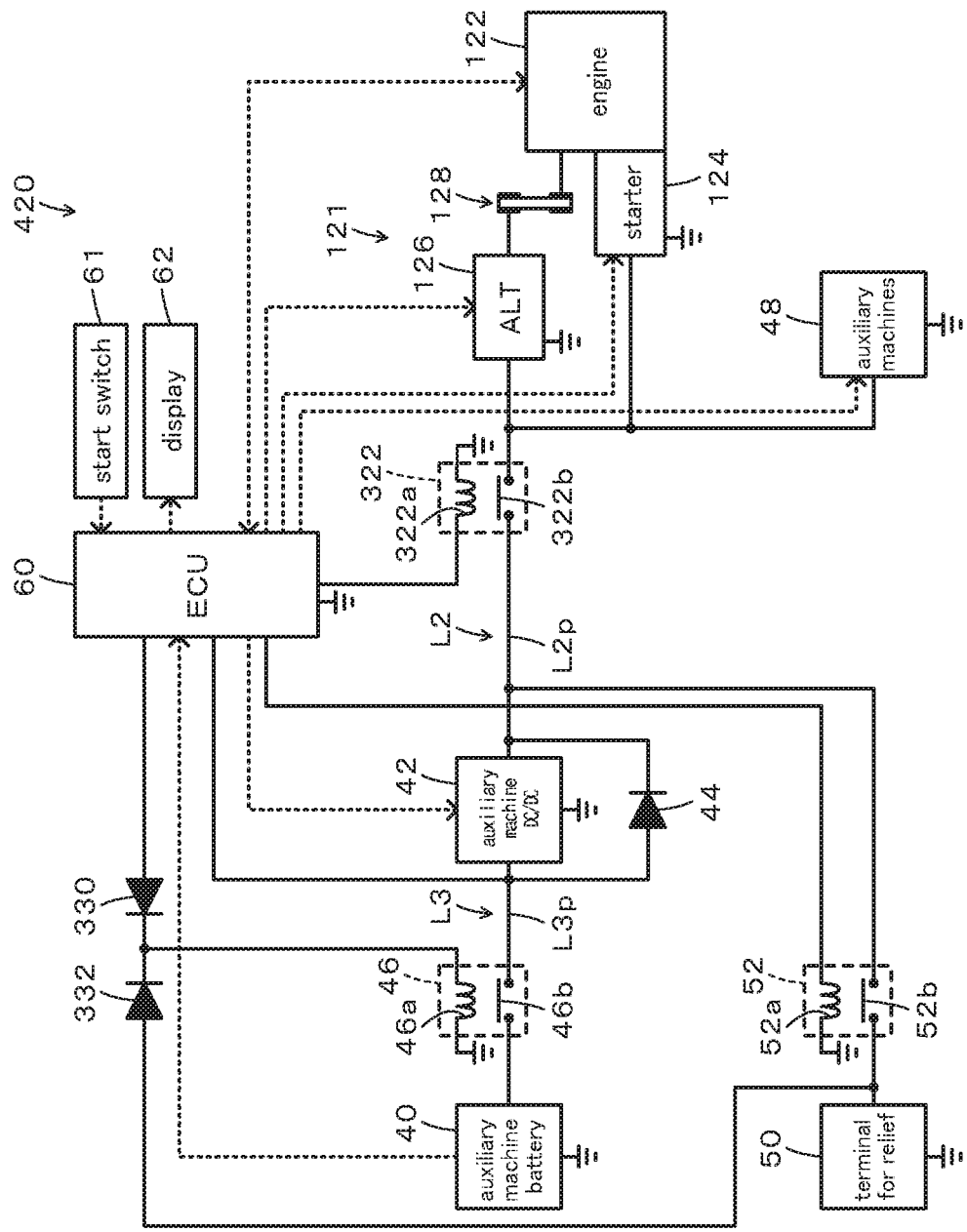
FIG. 9 is a configuration diagram illustrating the schematic configuration of a motor vehicle according to a modification of the second embodiment.

The motor vehicle 420 shown in FIG. 9 is described below. The motor vehicle 420 of FIG. 9 has a similar hardware configuration to that of the motor vehicle 320 shown in FIG. 6, except replacement of the driving system 21 with the driving system 121 that is employed in the motor vehicle 120 of FIG. 4. In this motor vehicle 420, the relay 322 is provided between the starter 124-, the alternator 126- and the auxiliary machines 48-side and the auxiliary machine DC-DC converter 42-, the diode 44- and the relay 52—(i.e., the terminal for relief 50-) side in the positive electrode line L2p of the power lines L2. The relay 322 is turned on and off to connect and disconnect the starter 124-, the alternator 126- and the auxiliary machines 48-side with and from the auxiliary machine DC-DC converter 42-, the diode 44- and the relay 52-side. In this motor vehicle 420, the ECU 60 similarly performs the processing routine of FIG. 7. Such control causes the motor vehicle 420 to have similar advantageous effects to those of the motor vehicle 320 described above.

Figure 10:
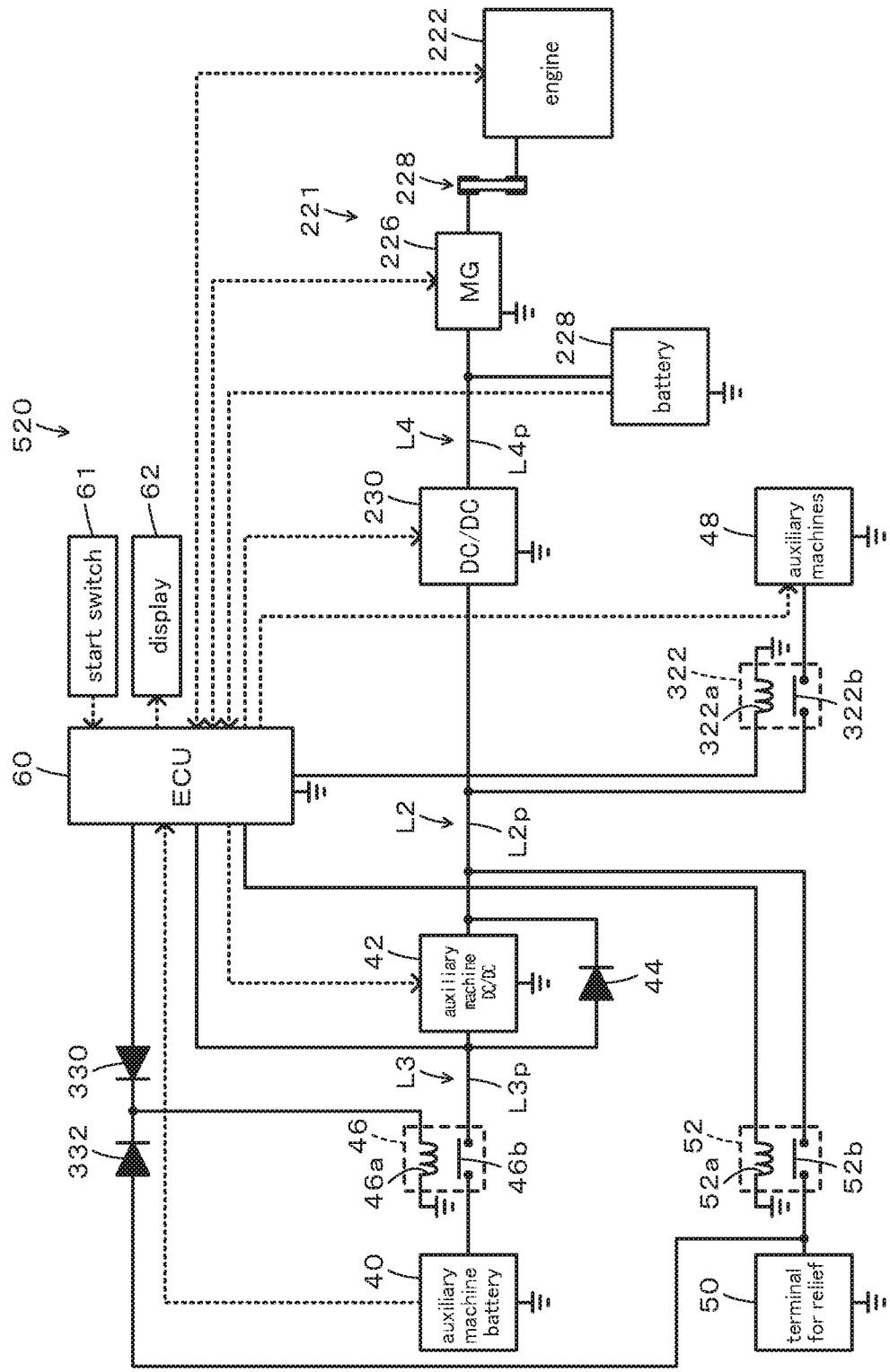
FIG. 10 is a configuration diagram illustrating the schematic configuration of a motor vehicle according to another modification of the second embodiment.

The motor vehicle 520 shown in FIG. 10 is described below. The motor vehicle 520 of FIG. 10 has a similar hardware configuration to that of the motor vehicle 320 shown in FIG. 6, except replacement of the driving system 21 with the driving system 221 that is employed in the motor vehicle 220 of FIG. 5. In this motor vehicle 520, the relay 322 is provided between the auxiliary machines 48-side and the DC-DC converter 230-, the auxiliary machine DC-DC converter 42-, the diode 44- and the relay 52—(i.e., the terminal for relief 50-) side in the positive electrode line L2p of the power lines L2 and is turned on and off to connect and disconnect the auxiliary machines 48-side with and from the DC-DC converter 230-, the auxiliary machine DC-DC converter 42-, the diode 44- and the relay 52-side. In this motor vehicle 520, the ECU 60 similarly performs the processing routine of FIG. 7. Such control causes the motor vehicle 520 to have similar advantageous effects to those of the motor vehicle 320 described above.

Third Embodiment

Figure 11:
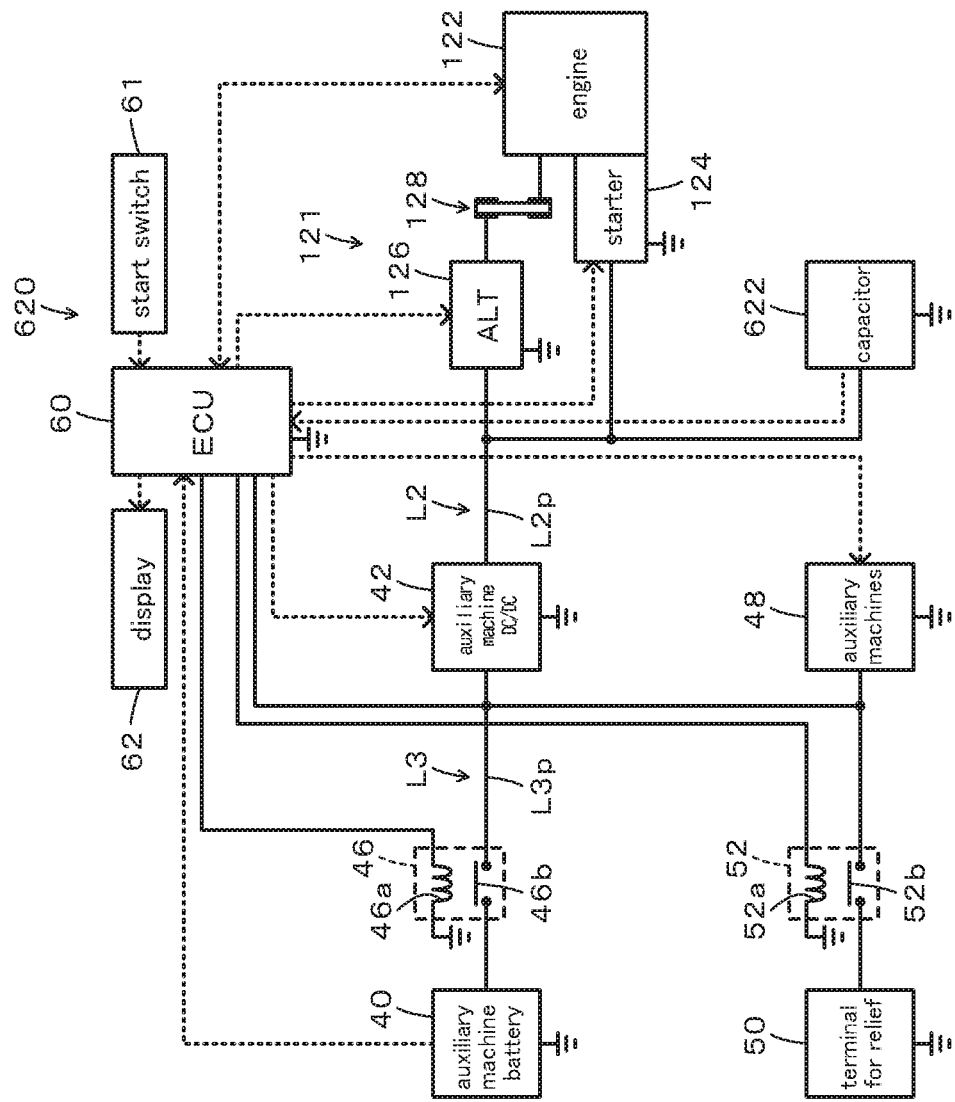
FIG. 11 is a configuration diagram illustrating the schematic configuration of a motor vehicle according to a third embodiment of the present disclosure.

FIG. 11 is a configuration diagram illustrating the schematic configuration of a motor vehicle 620 according to a third embodiment of the present disclosure.

The motor vehicle 620 shown in FIG. 11 has a similar hardware configuration to that of the motor vehicle 120 according to the modification of the first embodiment shown in FIG. 4, except addition of a capacitor 622, omission of the diode 44, a different connection destination of the positive electrode terminals of the auxiliary machines 48, a different connection destination of the positive electrode terminal of the ECU 60 and a different position of the relay 52. Accordingly, like hardware components of the motor vehicle 620 to those of the motor vehicle 120 are expressed by like reference signs with omission of their detailed description.

The capacitor 622 is configured, for example, as a capacitor having a rated voltage of about 12 V to 16 V (i.e., a voltage level equivalent to that of the auxiliary machine battery 40) and has one terminal that is connected with the positive electrode line Lp2 of the power lines L2 and the other terminal that is grounded to the vehicle body. Each of the auxiliary machines 48 has a positive electrode terminal that is connected with the positive electrode line L3p of the power lines L3 and a negative electrode terminal that is grounded to the vehicle body. The relay 52 is turned on and off to connect and disconnect the terminal for relief 50 with and from the positive electrode line L3p of the power lines L3.

The ECU 60 has a positive electrode terminal that is connected with the positive electrode line L3p of the power lines L3 and a negative electrode terminal that is grounded to the vehicle body and is operated with electric power received through the power lines L3. For example, a voltage Vc from a voltage sensor configured to detect the voltage of the capacitor 622 and an electric current Ic from a current sensor configured to detect the electric current of the capacitor 622 are input into the ECU 60 via the input port, in addition to various signals similar to the input signals described above with regard to the motor vehicle 120. The ECU 60 calculates a state of charge SOCc of the capacitor 622, based on the electric current Ic of the capacitor 622 input from the current sensor.

Figure 12:
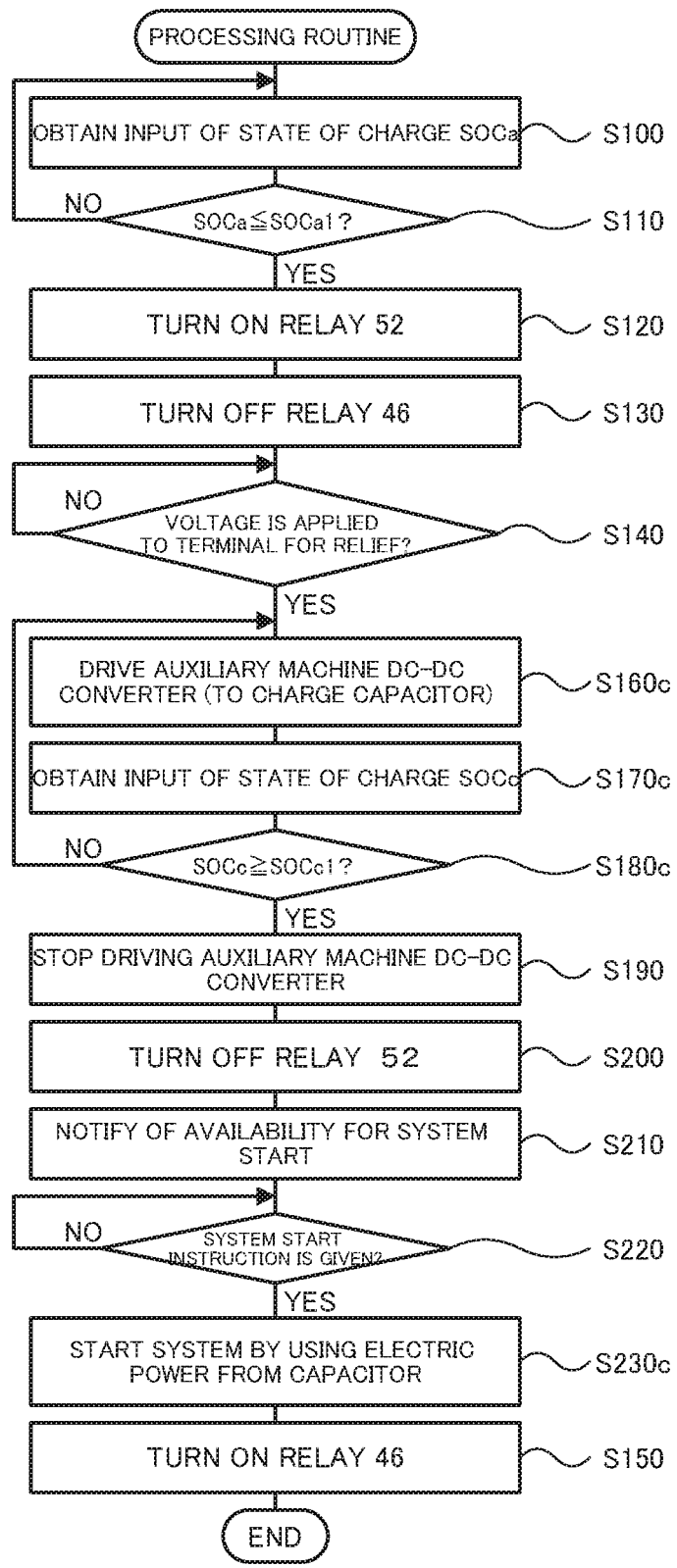
FIG. 12 is a flowchart showing one example of a processing routine according to the third embodiment.

The following describes operations of the motor vehicle 620 of the third embodiment having the configuration described above or more specifically a series of operations to start the system of the motor vehicle 620 after the motor vehicle 620 is left for a long time period. FIG. 12 is a flowchart showing one example of a processing routine. This processing routine is triggered when the motor vehicle 620 is parked and the system is stopped. The processing routine is performed by the ECU 60 except the processing of step S140. This processing routine of FIG. 12 is similar to the processing routine of FIG. 2, except replacement of the processing of steps S160 to S180 and the processing of step S230 with the processing of steps S160c to S180c and the processing of step S230c and execution of the processing of step S150 after the processing of step S230c. Accordingly, like processing steps in the processing routine of FIG. 12 to those in the processing routine of FIG. 2 are expressed by like step numbers with omission of their detailed description.

In the processing routine of FIG. 12, when the state of charge SOCa of the auxiliary machine battery 40 becomes equal to or lower than the reference value SOCa1 (step S110), the ECU 60 turns on the relay 52 (step S120) and subsequently turns off the relay 46 (step S130). As described above, turning off the relay 46 stops the ECU 60. When an external power source for rescue is subsequently connected with the terminal for relief 50 to apply a voltage to the terminal for relief 50 (step S140), electric power is supplied from the terminal for relief 50 through the power lines L3 to the ECU 60, so as to start the ECU 60.

The ECU 60 subsequently controls the auxiliary machine DC-DC converter 42, such that the electric power of the power lines L3 (i.e., the electric power from the external power source) is subjected to voltage conversion and is then supplied to the power lines L2 (i.e., to the capacitor 622) (step S160c). Even when the voltages of the capacitor 622 and the external power source differ from each other by some degree, such control suppresses generation of an overvoltage or an overcurrent in the capacitor 622. In this state, the driving system 121 and the auxiliary machines 48 keep their inactive states.

The ECU 60 subsequently obtains the input of the state of charge SOCc of the capacitor 622 (step S170c) and compares the input state of charge SOCc of the capacitor 622 with a reference value SOCc1 (step S180c). The reference value SOCc1 herein denotes a threshold value used to determine whether an amount of electric power (an amount of charge) required for a system start is ensured and may be, for example, 25%, 30% or 35%. When the state of charge SOCc of the capacitor 622 is lower than the reference value SOCc1, the ECU 60 returns the processing routine to step S160c.

When the state of charge SOCc of the capacitor 622 becomes equal to or higher than the reference value SOCc1 at step S180c by repetition of the processing of steps S160c to S180c, the ECU 60 stops driving the auxiliary machine DC-DC converter 42 (step S190) and turns off the relay 52

(step S200). The ECU 60 subsequently notifies the user of the availability for a system start (step S210), waits for the user's system start instruction (step S220), and starts the system by using the electric power from the capacitor 622 (step S230c). In the process of starting the engine 122 by the system start, electric power is supplied from the capacitor 622 through the power lines L2 to the starter 124. Starting the system by using the electric power from the capacitor 622 after turning off the relay 52, i.e., after disconnecting the power lines L3 from the terminal for relief 50 that is connected with the external power source, enables the system to be started without being affected by the voltage and the like from the external power source and suppresses noise generated in the course of a system start from being transmitted to the external power source.

After starting the system, the ECU 60 turns on the relay 46 (step S150) and then terminates this processing routine. After turning on the relay 46, the ECU 60 controls the auxiliary machine DC-DC converter 42, such that the electric power of the power lines L2 is subjected to voltage conversion and is then supplied to the power lines L3. This configuration causes electric power generated by the alternator 126 using the electric power from the capacitor 622 and the power from the engine 122 to be supplied through the power lines L2, the auxiliary machine DC-DC converter 42 and the power lines L3 to the auxiliary machine battery 40, so as to charge the auxiliary machine battery 40.

Figure 13:
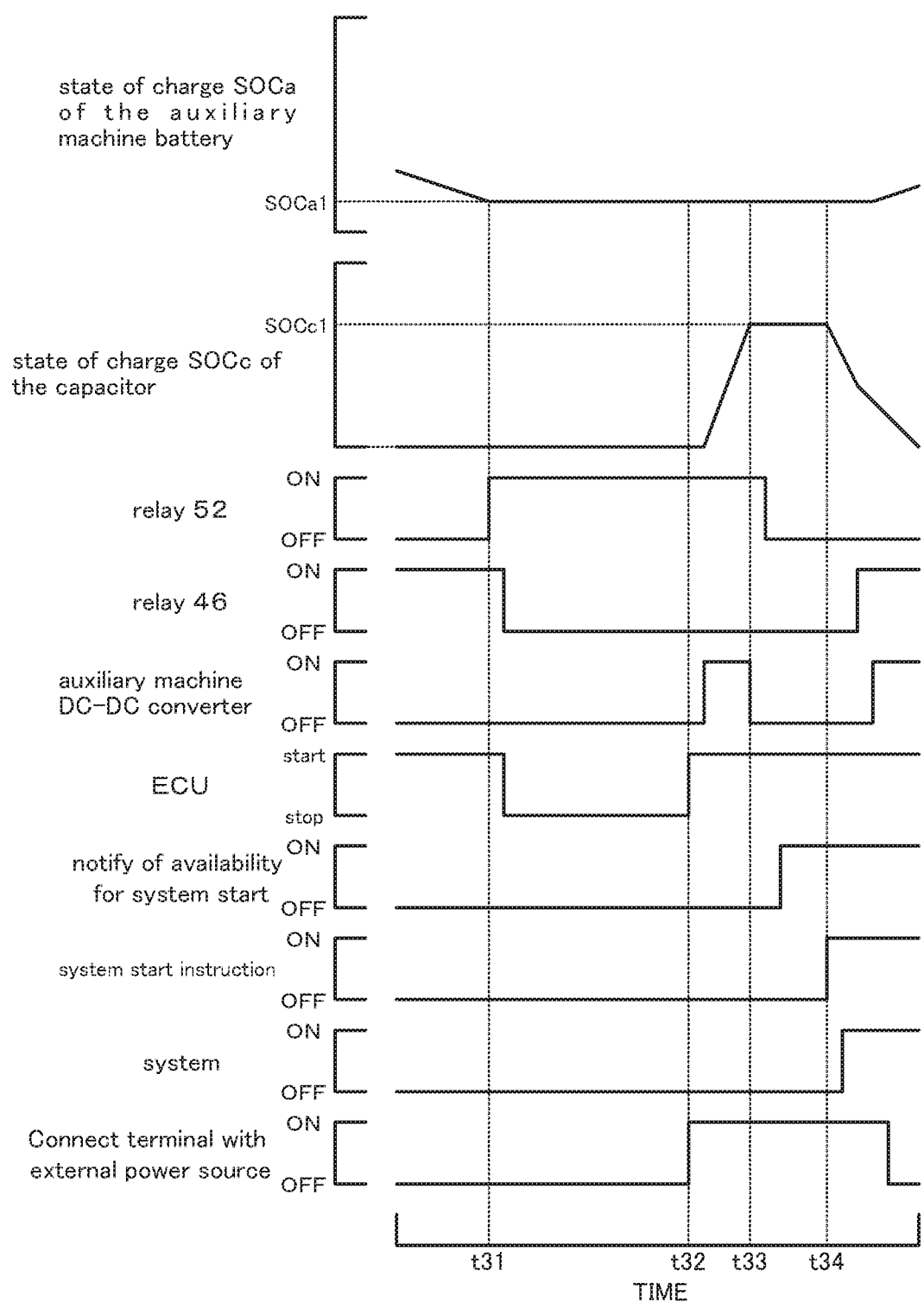
FIG. 13 is a diagram illustrating one example of a process of a system start of the motor vehicle after the motor vehicle of the third embodiment is left for a long time period.

FIG. 13 is a diagram illustrating one example of a process of a system start of the motor vehicle 620 after the motor vehicle 620 is left for a long time period. As illustrated, when the state of charge SOCa of the auxiliary machine battery 40 becomes equal to or lower than the reference value SOCa1 (at a time t31), the ECU 60 turns on the relay 52 and subsequently turns off the relay 46. Turning off the relay 46 stops the ECU 60. Subsequent connection of an external power source for rescue with the terminal for relief 50 to apply a voltage to the terminal for relief 50 (at a time t32) starts the ECU 60. The ECU 60 controls the auxiliary machine DC-DC converter 42, such that the electric power of the power lines L3 is subjected to voltage conversion and is then supplied to the power lines L2. This enables the capacitor 622 to be charged with the electric power from the external power source.

When the state of charge SOCc of the capacitor 622 becomes equal to or higher than the reference value SOCc1 (at a time t33), the ECU 60 stops driving the auxiliary machine DC-DC converter 42, turns off the relay 52 and notifies the user of the availability for system start. In response to the user's subsequent system start instruction (at a time t34), the ECU 60 starts the system by using the electric power from the capacitor 622. On completion of the system start, the ECU 60 turns on the relay 46 and controls the auxiliary machine DC-DC converter 42, such that the electric power of the power lines L2 is subjected to voltage conversion and is then supplied to the power lines L3. This enables the auxiliary machine battery 40 to be charged with the electric power from the capacitor 622 and with the electric power generated by the alternator 126. After the relay 52 is turned off, the external power source is detached from the terminal for relief 50 by the user.

In the motor vehicle 620 of the third embodiment described above, when an external power source for rescue is connected with the terminal for relief 50 to apply a voltage to the terminal for relief 50 during a stop of the ECU 60 at the on position of the relay 52 and at the off position of the relay 46, this starts the ECU 60. The ECU 60 controls the auxiliary machine DC-DC converter 42, such that the electric power of the power lines L3 (i.e., the electric power from the external power source) is subjected to voltage conversion and is then supplied to the power lines L2 (i.e., the capacitor 622). Even when the voltages of the capacitor 622 and the external power source differ from each other by some degree, such control enables the capacitor 622 to be charged, while suppressing generation of an overvoltage or an overcurrent in the capacitor 622. On completion of charging of the capacitor 622, the motor vehicle 620 of the third embodiment turns off the relay 52 and subsequently starts the system by using the electric power from the capacitor 622 in response to the user's system start instruction. This enables the system to be started without being affected by the voltage and the like from the external power source and suppresses noise generated in the course of a system start from being transmitted to the external power source.

The motor vehicle 620 of the third embodiment is configured to notify the user of the availability for system start after completion of charging of the capacitor 622 and a subsequent off operation of the relay 52 and to start the system by using the electric power from the capacitor 622 in response to the user's system start instruction. A modification may automatically start the system in response to completion of charging of the capacitor 622 and a subsequent off operation of the relay 52.

Fourth Embodiment

Figure 14:
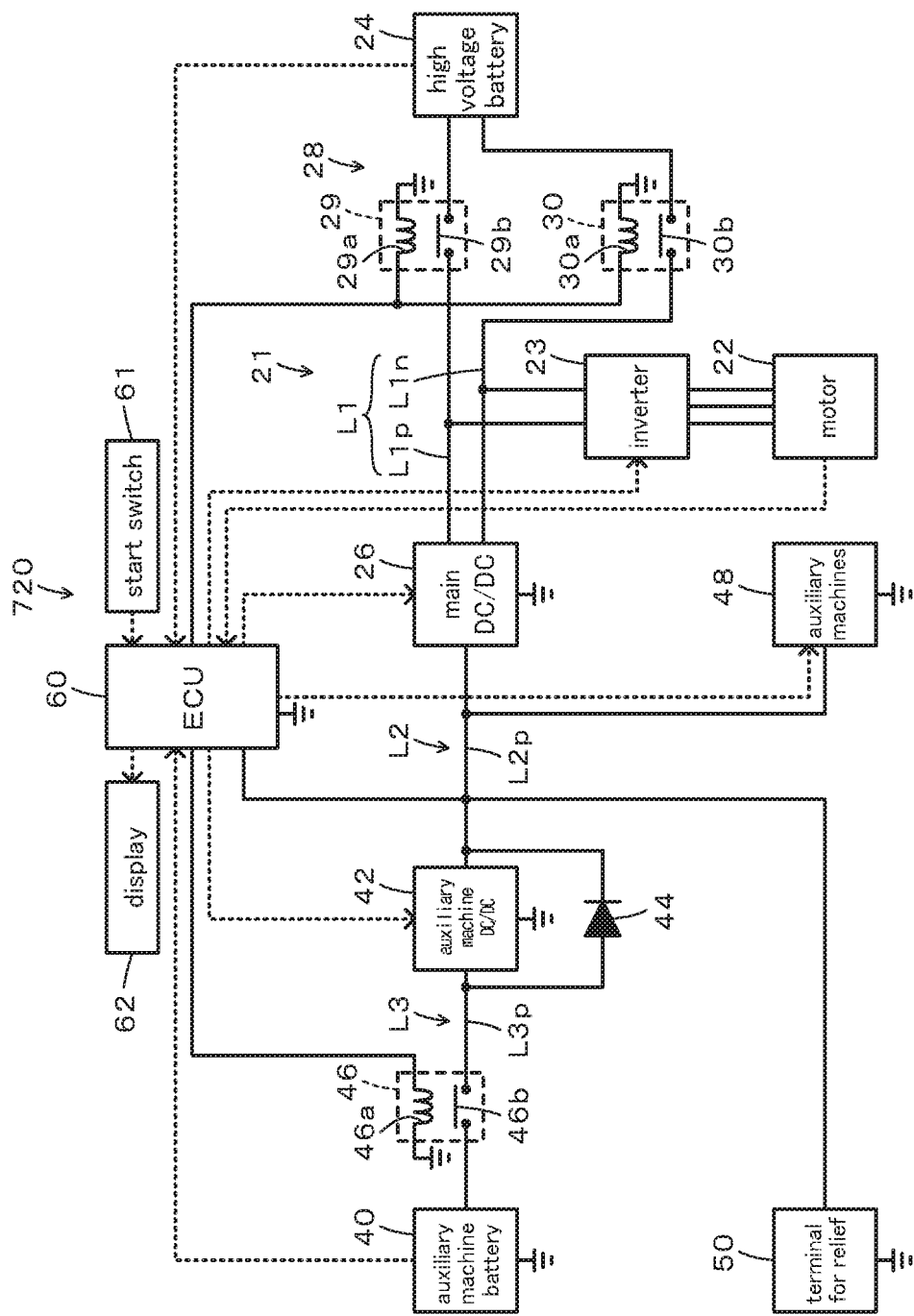
FIG. 14 is a diagram illustrating the schematic configuration of a motor vehicle according to a fourth embodiment of the present disclosure.

FIG. 14 is a diagram illustrating the schematic configuration of a motor vehicle 720 according to a fourth embodiment of the present disclosure. The motor vehicle 720 shown in FIG. 14 has a similar hardware configuration to that of the motor vehicle 20 of the first embodiment shown in FIG. 1, except omission of the relay 52. Accordingly, like hardware components of the motor vehicle 720 to those of the motor vehicle 20 are expressed by like reference signs with omission of their detailed description.

Figure 15:
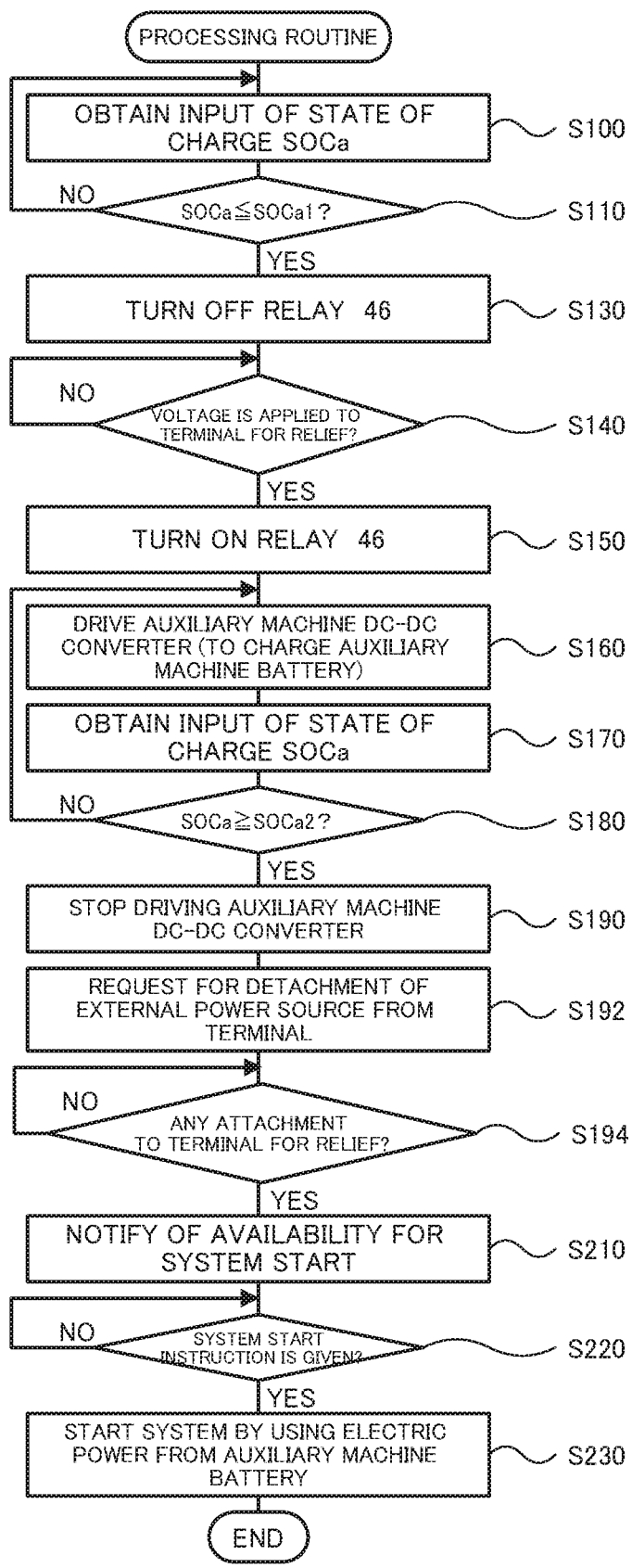
FIG. 15 is a flowchart showing one example of a processing routine according to the fourth embodiment.

The following describes operations of the motor vehicle 720 of the fourth embodiment having the configuration described above or more specifically a series of operations to start the system of the motor vehicle 720 after the motor vehicle 720 is left for a long time period. FIG. 15 is a flowchart showing one example of a processing routine. This processing routine is triggered when the motor vehicle 720 is parked and the system is stopped. The processing routine is performed by the ECU 60 except the processing of step S140. This processing routine of FIG. 15 is similar to the processing routine of FIG. 2, except omission of the processing of steps S120 and S200 and addition of the processing of steps S192 and S194. Accordingly, like processing steps in the processing routine of FIG. 15 to those in the processing routine of FIG. 2 are expressed by like step numbers with omission of their detailed description.

In the processing routine of FIG. 15, when the state of charge SOCa of the auxiliary machine battery 40 becomes equal to or lower than the reference value SOCa1 (step S110), the ECU 60 turns off the relay 46 (step S130). As described above, turning off the relay 46 stops the ECU 60. When an external power source for rescue is subsequently connected with the terminal for relief 50 to apply a voltage to the terminal for relief 50 (step S140), the ECU 60 is started. The ECU 60 turns on the relay 46 (step S150) and controls the auxiliary machine DC-DC converter 42, such that the electric power of the power lines L2 (i.e., the electric power from the external power source) is subjected to voltage conversion and is then supplied to the power lines L3 (the auxiliary machine battery 40), until the state of charge SOCa of the auxiliary machine battery 40 becomes equal to or higher than the reference value SOCa2 (steps S160 to S180). Even when the voltages of the auxiliary machine battery 40 and the external power source differ from each other by some degree, such control suppresses generation of an overvoltage or an overcurrent in the auxiliary machine battery 40. In this state, the driving system 21 and the auxiliary machines 48 keep their inactive states. When the state of charge SOCa of the auxiliary machine battery 40 becomes equal to or higher than the reference value SOCa2 (step S180), the ECU 60 stops driving the auxiliary machine DC-DC converter 42 (step S190).

The ECU 60 subsequently requests the user to detach the external power source from the terminal for relief 50 (step S192) and waits for the user's detachment of the external power source from the terminal for relief 50 (step S194). For example, a concrete procedure of the processing of step S192 may display a message such as "Please detach the cable from the terminal for relief" on the display 62 or may provide audio output of such a message from a speaker (not shown). This causes the user to recognize the necessity for detachment of the external power source from the terminal for relief 50. For example, a concrete procedure of the processing of step S194 may check the voltage of the power lines L2. This is on the basis of that detachment of the external power source from the terminal for relief 50 lowers the voltage level of the power lines L2 from the voltage of the external power source to a voltage that is practically equal to the open voltage of the auxiliary machine battery 40.

When the external power source is detached from the terminal for relief 50, the ECU 60 notifies the user of the availability for a system start (step S210), waits for the user's system start instruction (step S220), starts the system by using the electric power from the auxiliary machine battery 40 (step S230), and then terminates this processing routine. Starting the system by using the electric power from the auxiliary machine battery 40 after detachment of the external power source from the terminal for relief 50 enables the system to be started without being affected by the voltage and the like from the external power source and suppresses noise generated in the course of a system start from being transmitted to the external power source.

Figure 16:
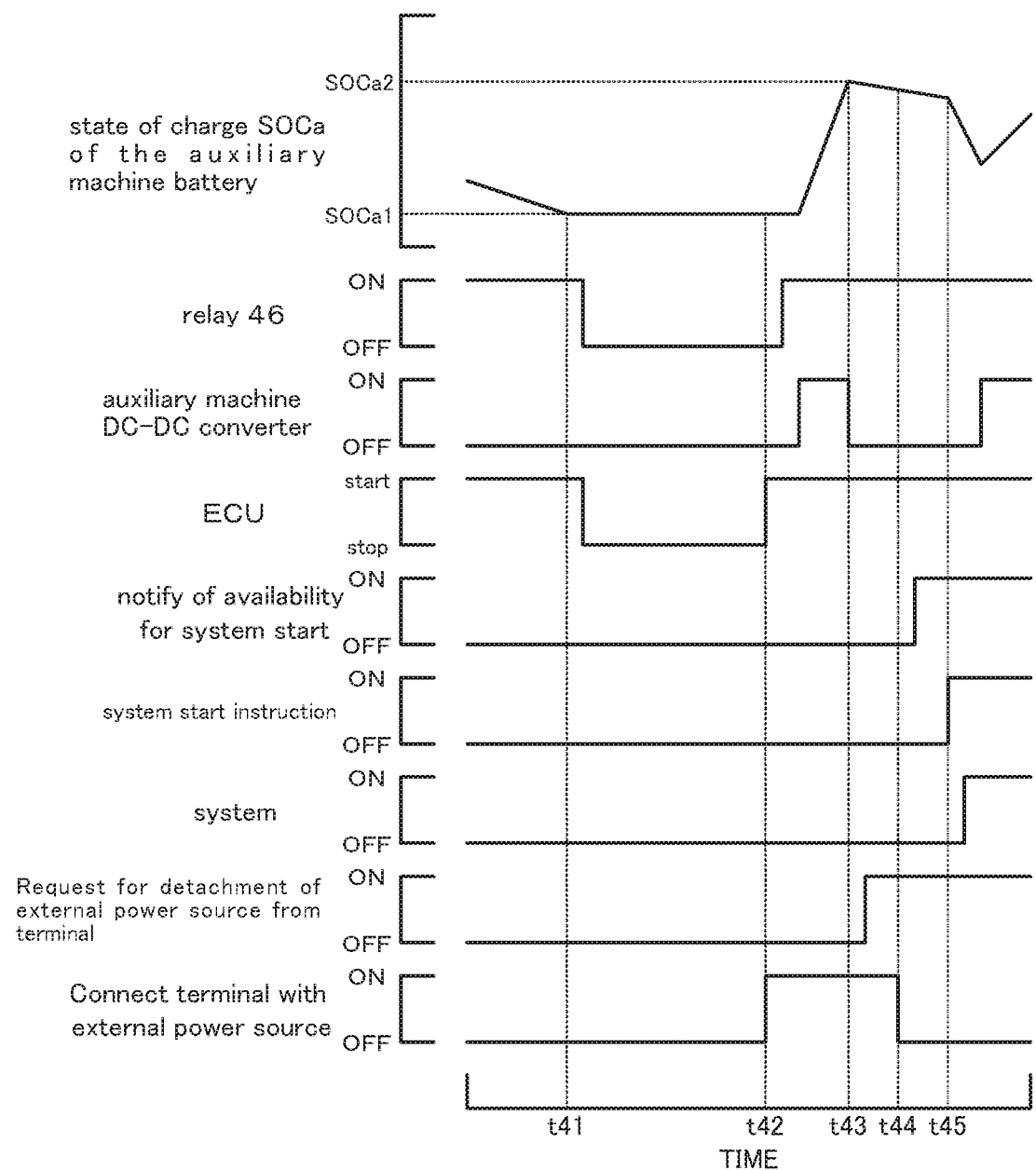
FIG. 16 is a diagram illustrating one example of a process of a system start of the motor vehicle after the motor vehicle of the fourth embodiment is left for a long time period.

FIG. 16 is a diagram illustrating one example of a process of a system start of the motor vehicle 720 after the motor vehicle 720 is left for a long time period. As illustrated, when the state of charge SOCa of the auxiliary machine battery 40 becomes equal to or lower than the reference value SOCa1 (at a time t41), the ECU 60 turns off the relay 46. Turning off the relay 46 stops the ECU 60. Subsequent connection of an external power source for rescue with the terminal for relief 50 to apply a voltage to the terminal for relief 50 (at a time t42) starts the ECU 60. The ECU 60 turns on the relay 46 and controls the auxiliary machine DC-DC converter 42, such that the electric power of the power lines L2 is subjected to voltage conversion and is then supplied to the power lines L3. This enables the auxiliary machine battery 40 to be charged with the electric power from the external power source.

When the state of charge SOCa of the auxiliary machine battery 40 becomes equal to or higher than the reference value SOCa2 (at a time t43), the ECU 60 stops driving the auxiliary machine DC-DC converter 42 and requests the user to detach the external power source from the terminal for relief 50. When the user detaches the external power source from the terminal for relief 50 (at a time t44), the ECU 60 notifies the user of the availability for system start. In response to the user's subsequent system start instruction (at a time t45), the ECU 60 starts the system by using the electric power from the auxiliary machine battery 40. On completion of the system start, the ECU 60 controls the main DC-DC converter 26, such that the electric power of the power lines L1 is subjected to voltage conversion and is then supplied to the power lines L2, and controls the auxiliary machine DC-DC converter 42, such that the electric power of the power lines L2 is subjected to voltage conversion and is then supplied to the power lines L3. This enables the auxiliary machine battery 40 to be charged with the electric power from the high voltage battery 24.

In the motor vehicle 720 of the fourth embodiment described above, when an external power source for rescue is connected with the terminal for relief 50 to apply a voltage to the terminal for relief 50 during a stop of the ECU 60 at the off position of the relay 46, this starts the ECU 60. The ECU 60 turns on the relay 46 and controls the auxiliary machine DC-DC converter 42, such that the electric power of the power lines L2 (i.e., the electric power from the external power source) is subjected to voltage conversion and is then supplied to the power lines L3 (i.e., the auxiliary machine battery 40). Even when the voltages of the auxiliary machine battery 40 and the external power source differ from each other by some degree, such control enables the auxiliary machine battery 40 to be charged, while suppressing generation of an overvoltage or an overcurrent in the auxiliary machine battery 40. On completion of charging of the auxiliary machine battery 40, the motor vehicle 720 of the fourth embodiment request the user to detach the external power source from the terminal for relief 50. When the user detaches the external power source from the terminal for relief 50, the motor vehicle 720 starts the system by using the electric power from the auxiliary machine battery 40 in response to the user's system start instruction. This enables the system to be started without being affected by the voltage and the like from the external power source and suppresses noise generated in the course of a system start from being transmitted to the external power source. The motor vehicle 720 requests the user to detach the external power source from the terminal for relief 50 and thereby does not need the relay 52, which is provided in the motor vehicles 20, 120, 220, 320, 420, 520 and 620 of the first embodiment to the third embodiment and their modifications. This configuration reduces the total number of components.

When the user detaches the external power source from the terminal for relief 50 after completion of charging of the auxiliary machine battery 40, the motor vehicle 720 of the fourth embodiment notifies the user of the availability for system start. A modification may not notify the user of the availability for system start.

When the user detaches the external power source from the terminal for relief 50 after completion of charging of the auxiliary machine battery 40, the motor vehicle 720 of the fourth embodiment notifies the user of the availability for system start. The motor vehicle 720 of the fourth embodiment then starts the system by using the electric power from the auxiliary machine battery 40 in response to the user's subsequent system start instruction. A modification may automatically start the system when the user detaches the external power source from the terminal for relief 50.

Figure 17:
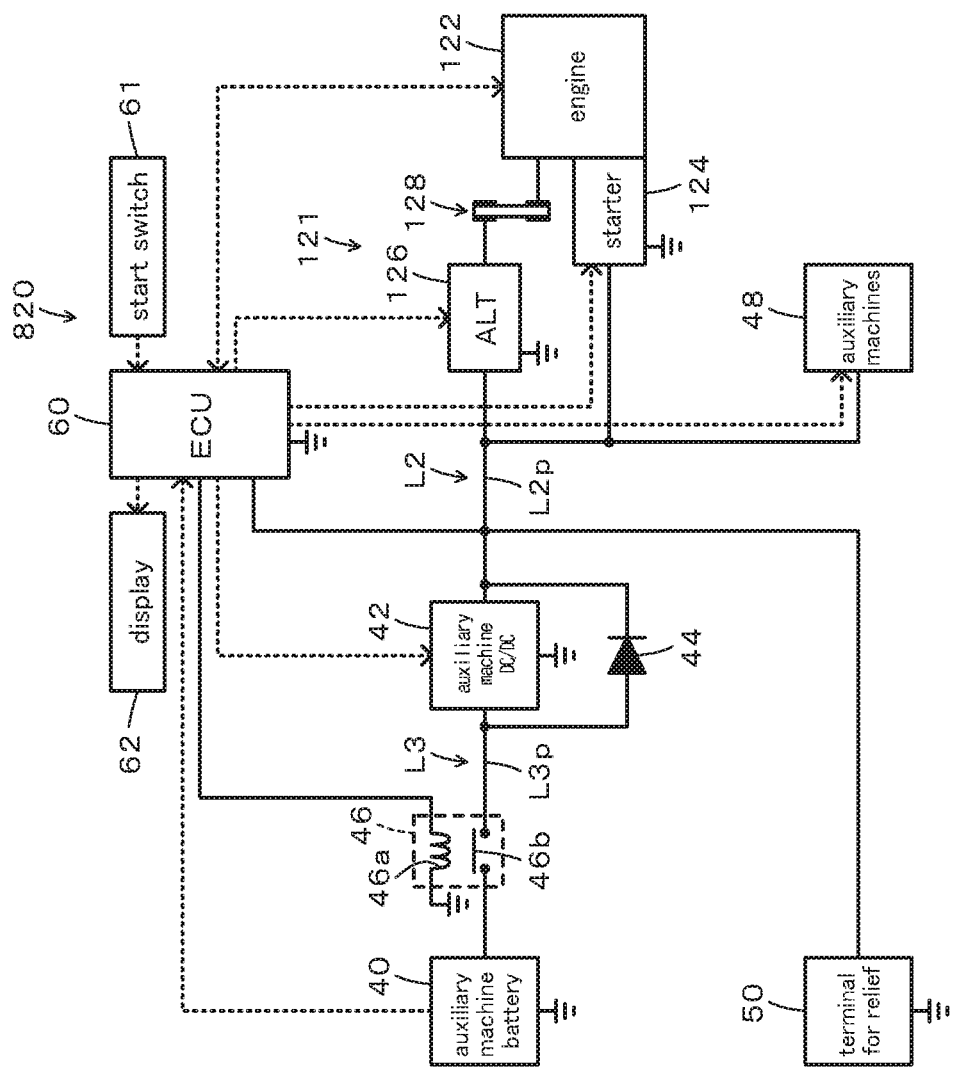
FIG. 17 is a configuration diagram illustrating the schematic configuration of a motor vehicle according to a modification of the fourth embodiment.

The motor vehicle 720 of the fourth embodiment has the configuration shown in FIG. 14. The present disclosure may also be applied to a motor vehicle 820 of a modification having a configuration shown in FIG. 17. The motor vehicle 820 shown in FIG. 17 has a similar hardware configuration to that of the motor vehicle 120 according to the modification of the first embodiment shown in FIG. 4, except omission of the relay 52. In the motor vehicle 820 of this modification, the ECU 60 similarly performs the processing routine of FIG. 15. Accordingly, the motor vehicle 820 of this modification has similar advantageous effects to those of the motor vehicle 720 described above.

In the motor vehicles 20, 120, 220, 320, 420, 520, 620, 720 and 820 of the first to the fourth embodiments and their modifications, the relay 46 is configured as the ratchet electromagnetic relay. The relay 46 may, however, be configured as a normally open-type electromagnetic relay. In the motor vehicles 320, 420 and 520 of the second embodiment and its modifications, the relay 322 is configured as the ratchet electromagnetic relay. The relay 322 may, however, be configured as a normally open-type electromagnetic relay.

The motor vehicles 20, 120, 220, 620, 720, and 820 of the first, the third and the fourth embodiments and their modifications are provided with the relay 46. A modification may omit the relay 46. In the motor vehicles 320, 420 and 520 of the second embodiment and its modifications, on the other hand, when an external power source for rescue is connected with the terminal for relief 50 to apply a voltage to the terminal for relief 50 during a stop of the ECU 60 and at the off position of the relay 46, this turns on the relay 46 and supplies electric power from the auxiliary machine battery 40 through the power lines L3 to the ECU 60, so as to start the ECU 60. There is accordingly a need to turn off the relay 46 before the auxiliary machine battery 40 becomes incapable of discharging.

In the vehicle of the above aspect that may further include a relay turned on and off to connect and disconnect the connecting portion with and from the converter, wherein on completion of charging of the power storage device, the control device may turn off the relay and subsequently start the system by using electric power from the power storage device. In the vehicle of this configuration, turning off the relay disconnects the converter from the external power source that is connected with the connecting portion.

In the vehicle including the relay of the above aspect, the control device may notify a user of availability for system start when the converter is disconnected from the external power source. The vehicle of this configuration causes the user to recognize the availability for system start (i.e., permission for the user's system start instruction).

In the vehicle including the relay of the above aspect may further include a second relay turned on and off to connect and disconnect an auxiliary machine with and from the converter and the relay, wherein the control device may turn off the second relay and control the converter when the external power source is connected with the connecting portion, such that electric power from the external power source is subjected to voltage conversion and is then supplied to the power storage device. The vehicle of this configuration more sufficiently protects the auxiliary machine.

In the vehicle of the above aspect, the control device may request a user to detach the external power source from the connecting portion on completion of charging of the power storage device, and the control device may start the system by using electric power from the power storage device after detachment of the external power source from the connecting portion. In the vehicle of this configuration, the user's detachment of the external power source from the connecting portion results in disconnecting the converter from the external power source. There is accordingly no need to provide the relay, which is provided in the vehicles of the other configurations. This reduces the total number of components.

According to a modification of the vehicle of the present disclosure, the control device may be operated by receiving supply of electric power from a power line that is arranged to connect the converter with the connecting portion and with a drive system for driving.

The following describes the correspondence relationship between the primary components of the above embodiments and the primary components of the present disclosure described in Summary. The auxiliary machine battery 40, the auxiliary machine DC-DC converter 42 and the ECU 60 of the first, the second and the fourth embodiments respectively correspond to the "power storage device", the "converter" and the "control device" of the present disclosure. The capacitor 622, the auxiliary machine DC-DC converter 42 and the ECU 60 of the third embodiment respectively correspond to the "power storage device", the "converter" and the "control device" of the present disclosure.

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the vehicle and so on.

What is claimed is:
1. A vehicle, comprising:
a power storage device;
a connecting portion configured to be connectable with an external power source;
a converter configured to be connected with the connecting portion and with the power storage device; and
a control device configured to control the converter, wherein
when the external power source is connected with the connecting portion, the control device controls the converter, such that electric power from the external power source is subjected to voltage conversion and is then supplied to the power storage device, and
on completion of charging of the power storage device, the control device starts a system by using electric power from the power storage device after disconnection of the converter from the external power source.
2. The vehicle according to claim 1, further comprising:
a relay turned on and off to connect and disconnect the connecting portion with and from the converter, wherein on completion of charging of the power storage device, the control device turns off the relay and subsequently starts the system by using electric power from the power storage device.

3. The vehicle according to claim 2, wherein when the converter is disconnected from the external power source, the control device notifies a user of availability for system start.

4. The vehicle according to claim 2, further comprising:
a second relay turned on and off to connect and disconnect an auxiliary machine with and from the converter and the relay, wherein
when the external power source is connected with the connecting portion, the control device turns off the second relay and controls the converter, such that electric power from the external power source is subjected to voltage conversion and is then supplied to the power storage device.

5. The vehicle according to claim 3, further comprising:
a second relay turned on and off to connect and disconnect an auxiliary machine with and from the converter and the relay, wherein
when the external power source is connected with the connecting portion, the control device turns off the second relay and controls the converter, such that electric power from the external power source is subjected to voltage conversion and is then supplied to the power storage device.

6. The vehicle according to claim 1, wherein on completion of charging of the power storage device, the control device requests a user to detach the external power source from the connecting portion, and
after detachment of the external power source from the connecting portion, the control device starts the system by using electric power from the power storage device.

* * * * *